US006600286B2

(12) United States Patent
Tanaka et al.

(10) Patent No.: US 6,600,286 B2
(45) Date of Patent: Jul. 29, 2003

(54) MOTOR CONTROL DEVICE AND MOTOR CONTROL METHOD

(75) Inventors: Hirotomo Tanaka, Nagano-Ken (JP); Hidetoshi Kodama, Nagano-Ken (JP); Masafumi Furuyama, Nagano-Ken (JP); Toshiyuki Takahara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/796,429

(22) Filed: Mar. 2, 2001

(65) Prior Publication Data

US 2001/0035724 A1 Nov. 1, 2001

(30) Foreign Application Priority Data

Mar. 3, 2000 (JP) ....................................... 2000-058486
Mar. 3, 2000 (JP) ....................................... 2000-058645

(51) Int. Cl.[7] ................................................ G05B 11/01
(52) U.S. Cl. ............. 318/560; 318/568.16; 318/568.17; 318/603; 318/282; 318/286; 318/366
(58) Field of Search ............................ 318/560, 568.16, 318/568.17, 603, 282, 286, 366, 369

(56) References Cited

U.S. PATENT DOCUMENTS 3,950,685 A * 4/1976 Kramer ...................... 318/561
4,369,402 A * 1/1983 Gabor et al. ................ 318/685
4,460,968 A * 7/1984 Cavill et al. ................ 364/519
4,591,774 A * 5/1986 Ferris et al. ................ 318/696
4,777,609 A 10/1988 Cavill et al. ................ 364/519
5,057,859 A * 10/1991 Ishimaru ..................... 354/400
5,210,562 A * 5/1993 Miyazawa et al. .......... 354/400
5,368,402 A * 11/1994 Takahashi et al. .......... 400/279
5,532,811 A * 7/1996 Nishikawa et al. ......... 355/316
5,826,157 A * 10/1998 Wierszewski ............... 399/396
5,894,315 A 4/1999 Yamane ....................... 347/37

FOREIGN PATENT DOCUMENTS

EP 0 807 528 11/1997
EP 0 865 929 9/1998

* cited by examiner

*Primary Examiner*—Bentsu Ro
*Assistant Examiner*—Rina I Duda
(74) *Attorney, Agent, or Firm*—Oblon, Spivak, McClelland, Maier & Neustadt, P.C.

(57) ABSTRACT

A motor control apparatus and a motor control method according to a first aspect of the invention are configured to instruct deenergization of a motor a predetermined period of time later than arrival of a subject to be driven by the motor at a speed measuring position. The predetermined period of time corresponds to a current speed of the motor upon arrival of the subject to be driven at the speed measuring position, and the speed measuring position is at a predetermined distance before a target stop position of the subject to be driven. The motor control apparatus according to a second aspect of the invention includes a position detector for detecting the position of paper driven by a paper feeding motor on the basis of output pulses of an encoder that rotates in response to rotation of the paper feeding motor, and a drive controller for controllably driving the paper feeding motor by additionally applying a current value to the paper feeding motor on the basis of a target value of the paper feeding amount and an output of the position detector. Further, a current value signal is generated that causes the paper to stop or rotate in the reverse direction from a normal paper feeding direction in response to output pulses of the encoder after the paper feeding amount reaches the target value. The drive controller also controllably drives the paper feeding motor in response to the current value signal.

35 Claims, 18 Drawing Sheets

MOTOR CONTROL DEVICE AND MOTOR CONTROL METHOD

BACKGROUND OF THE INVENTION

1. Field of the Invention

This invention relates to a motor control device and a motor control method, and more particularly, to a motor control device and a motor control method for stop position predictive control of at a terminal portion of a deceleration control period.

The invention also relates to a motor control device and a motor control method for paper feed control of a printer enabling a print over a wide area of a sheet including portions nearest to ends of the sheet.

The invention further relates to a recording medium having recorded a computer program for executing any of those motor control methods.

2. Related Background Art

First explained is general configuration of an ink jet printer using a motor control device and its control method.

FIG. 1 is a block diagram that shows general configuration of an ink jet printer.

The ink jet printer shown in FIG. 1 includes a paper feed motor (hereinafter also called a PF motor) 1 that feeds paper; a paper feed motor driver 2 that drives the paper feed motor 1; a carriage 3 that supports a head 9 fixed thereto to supply ink onto printing paper 50 and is driven to move in parallel to the printing paper 50 and vertically of the paper feeding direction; a carriage motor (hereinafter also called a CR motor) 4 that drives the carriage 3; a CR motor driver 5 that drives the carriage motor 4; a DC unit 6 that outputs a d.c. current for controlling the CR motor driver 5; a pump motor 7 that controls the draft of ink for the purpose of preventing clogging of the head 9; a pump motor driver 8 that drives the pump motor 7; a head driver 10 that drives and controls the head 9; a linear encoder 11 fixed to the carriage 3; a linear encoder coding plate 12 having slits in predetermined intervals; a rotary encoder 13 for the PF motor 1; a paper detecting sensor 15 that detects the terminal position of each sheet of paper under printing; a CPU 16 that controls the whole printer; a timer IC 17 that periodically generates interruption signals to the CPU 16; an interface portion (hereinafter also called IF) 19 that exchanges data with a host computer 18; an ASIC 20 that controls the character resolution, driving waveform of the head 9, and so on, in accordance with character information sent from the host computer 18 through the IF 19; a PROM 21, a RAM 22 and an EEPROM 23 that are used as an operation area of the ASIC 20 and the CPU 16 and a program storage area; a platen 25 that supports the printing paper 50; a transport roller 27 driven by the PF motor 1 to transport the printing paper 50; a pulley 30 attached to a rotating shaft of the CR motor 4; and a timing belt 31 driven by the pulley 30.

The DC unit 6 controls and drives the paper feed motor driver 2 and the CR motor driver 5 in response to a control instruction sent from the CPU 16 and outputs of the encoders 11, 13. Both the paper feed motor 1 and the CR motor 4 are DC motors.

FIG. 2 is a perspective view that illustrates configuration around the carriage 3 of the ink jet printer.

As shown in FIG. 2, the carriage 3 is connected to the carriage motor 4 by the timing belt 31 via the pulley 30, and driven to move in parallel with the platen 25 under guidance of a guide member 32. The carriage 3 has the recording head

9 projecting from its surface opposed to the printing paper and having a row of nozzles for releasing black ink and a row of nozzles for releasing color ink. These nozzles are supplied with ink from the ink cartridge 34 and release drops of ink onto the printing paper to print characters and images.

In a non-print area of the carriage 3, there is provided a capping device 35 for shutting nozzle openings of the recording head 9 when printing is not executed, and a pump unit 36 having the pump motor 7 shown in FIG. 1. When the carriage 3 moves from the print area to the non-print area, it contacts a lever, not shown, and the capping device 35 moves upward to close the head 9.

When any of the nozzle openings of the head 9 is clogged, or ink is forcibly released from the head 9 just after replacement of the cartridge 34, the pump unit 36 is activated while closing the head 9, and a negative pressure from the pump unit 36 is used to suck out ink from the nozzle openings. As a result, dust and paper powder are washed out from around the nozzle openings, and bubbles in the head 9, if any, are discharged together with the ink to the cap 37.

FIG. 3 is a diagram schematically illustrating configuration of the linear encoder 11 attached to the carriage 3.

The encoder 11 shown in Gig. 3 includes a light emitting diode 11$a$, collimator lens 11$b$ and detector/processor 11$c$. The detector/processor 11$c$ has a plurality of (four) photo diodes 11$d$, signal processing circuit 11$e$, and two comparators $\mathbf{11}_{fA}$, $\mathbf{11}_{fB}$.

When a voltage $V_{CC}$ is applied across opposite ends of the light emitting diode 11$a$ through a resistor, light is emitted from the light emitting diode 11$a$. This light is collimated into parallel beams by the collimator lens 11$b$, and the beams pass through the coding plate 12. The coding plate 12 has slits in predetermined intervals (for example, in intervals of 1/180 inch).

Parallel beams passing through the coding plate 12 enter into photo diodes 11$d$ through fixed slits, not shown, and are converted into electric signals. Electric signals output from these four photo diodes 11$d$ are processes in the signal processing circuit 11$e$. Signals output from the signal processing circuit 11$e$ are compared in the comparators $\mathbf{11}_{fA}$, $\mathbf{11}_{fB}$, and comparison results are output as pulses. Pulses ENC-A, ENC-B output from the comparators $\mathbf{11}_{fA}$, $\mathbf{11}_{fB}$ are outputs of the encoder 11.

FIGS. 4A and 4B are timing charts showing waveforms of two output signals from the encoder 11 during normal rotation of the CR motor and during its reverse rotation.

As shown in FIGS. 4A and 4B, in both normal rotation and reverse rotation of the CR motor, the pulse ENC-A and the pulse ENC-B are different in phase by 90 degrees. The encoder 4 is so configured that the pulse ENC-A is forward in phase by 90 degrees relative to the pulse ENC-B as shown in FIG. 4A when the CR motor 4 rotates in the normal direction, i.e., when the carriage 3 is moving in its main scanning direction whereas the pulse ENC-A is behind in phase by 90 degrees relative to the pulse ENC-B as shown in FIG. 4B when the CR motor 4 rotates in the reverse direction. Then, one period T of these pulses corresponds to each interval of the slits of the coding plate 12 (for example, 1/180 inch), and it is equal to the time required for the carriage 3 to move from a slit to another.

On the other hand, the rotary encoder 13 for the PF motor 1 has the same configuration as the linear encoder 11 except that the former is a rotatable disc that rotates in response to rotation of the PF motor 1, and the rotary encoder 13 also outputs two output pulses ENC-A, ENC-B. In ink jet printers, in general, slit interval of a plurality of slits provided on a coding plate of the encoder 13 for the PF motor 1 is 1/180 inch, and paper is fed by 1/1440 inch when the PF motor rotates by each slit interval.

FIG. 5 is a perspective view showing a part related to paper feeding and paper detection.

With reference to FIG. 5, explanation is made about the position of the paper detecting sensor 15 shown in FIG. 1. In FIG. 5, a sheet of printing paper 50 inserted into a paper feed inlet 61 of a printer 60 is conveyed into the printer 60 by a paper feed roller 64 driven by a paper feed motor 63. The forward end of the printing paper 50 conveyed into the printer 60 is detected by an optical paper detecting sensor 15, for example. The paper 50 whose forward end is detected by the paper detecting sensor 15 is transported by a paper feed roller 65 driven by the PF motor 1 and a free roller 66.

Subsequently, ink is released from the recording head (not shown) fixed to the carriage 3 which moves along the carriage guide member 32 to print something on the printing paper 50. When the paper is transported to a predetermined position, the terminal end of the printing paper 50 currently under printing is detected by the paper detecting sensor 15. The printing paper 50 after printing is discharged outside from a paper outlet 62 by a discharge roller 68 driven by a gear 67C, which is driven by the PF motor 1 via gears 67A, 67B, and a free roller 69.

FIG. 6 is a perspective view illustrating details of parts associated to paper feeding in a printer, where a paper feeding roller 65 has a rotation axis coupled to a rotary encoder 13.

With reference to FIG. 6 and FIG. 5, the parts in the printer associated to the paper feeding will now be described in details.

When a leading end of a printing paper 50, which has been inserted through a paper feed inlet 61 into a printer 60 by a sheet supplying roller 64, is detected by a paper detecting sensor 15, the paper feeding roller 65 and a follower roller 66 are cooperative in feeding the printing paper 50. The paper feeding roller 65 is provided on and about a small shaft 83 or a rotation axis of a large gear 67*a* engaged with a small gear 87 driven by a PF motor 1 while the follower roller 66 is provided in a holder 89 at its paper evacuating end in the context of a paper feeding direction, where the printing paper 50 from a paper supply source is pressed vertically.

The PF motor 1 is fitted in and secured to a frame 86 in the printer 60 by a screw 85, and the rotary encoder 13 is placed in a specified position around the large gear 67*a* while a character board 14 for the rotary encoder is connected to the smap shaft 83 or the rotation axis of the large gear 67*a*.

After the printing paper 50, which has already been supplied by the paper feeding roller 65 and the follower roller 66 into the printer, passes over a platen 84 serving to support the printing paper 50, a paper evacuating gear 68 which is rotated by the PF motor 1 via a group of gears, the small gear 87, the large gear 67*a*, a medium gear 67*b*, a small gear 88, and a paper evacuating gear 67*c*, and a toothed roller 69 or a follower roller cooperatively presses and holds the printing paper 50 between them to further feed the printing paper 50 until it is evacuated from the paper outlet 62 to the outside of the printer.

While the printing paper 50 lies over the platen 84, a carriage 3 moves laterally in a space defined above the platen 84 along a guide member 32, and simultaneously, ink is injected from a recording head (not shown) fixed to the carriage 3 to print characters in the printing paper.

Now, an arrangement of a DC unit 6 will be described, which is a prior art DC motor control apparatus used to control a carriage (CR) motor 4 for such an ink jet printer as mentioned above, and additionally, a control method by the DC unit 6 will also be explained.

FIG. 7 is a block diagram showing an arrangement of the DC unit 6 serving as the DC motor control apparatus while FIGS. 8A and 8B are graphs illustrating time-varying motor current and motor speed of the CR motor 4 under control by the DC unit 6.

The DC unit 6 shown in FIG. 7 includes a position operator 6*a*, a subtracter 6*b*, a target speed operator 6*c*, a speed operator 6*d*, a subtracter 6*e*, a proportional element 6*f*, an integral element 6*g*, a differential element 6*h*, an adder 6*i*, a D/A converter 6*j*, a timer 6*k*, and an acceleration controller 6*m*.

The position operator 6*a* detects rising edges and tail edges of the output pulses ENC-A and ENC-B of the encoder 11, then counts the number of edges detected, and operates the position of the carriage 3 from the counted value. This counting adds "+1" when one edge is detected while the CR motor 4 rotates in the normal direction, and adds "−1" when one edge is detected while the CR motor 4 rotates in the reverse direction. Period of pulses ENC-A and period of pulses ENC-B are equal to the slit interval of the coding plate 12, and the pulses ENC-A and ENC-B are different in phase by 90 degrees. Therefore, the count value "1" of that counting corresponds to ¼ of the slit interval of the coding plate 12. As a result, distance of the movement from the position of the carriage 3, at which the count value corresponds to "0", can be obtained by multiplying the above count value by ¼ of the slit interval. Resolution of the encoder 11 in this condition is ¼ of the slit interval of the coding plate 12. If the slit interval is 1/180 inch, then the resolution is 1/720 inch.

The subtracter 6*b* operates positional difference between the target position sent from the CPU 16 and the actual position of the carriage 3 obtained by the position operator 6*a*.

The target speed calculator 6*c* computes a target speed of the carriage 3 by referring to a positional deviation produced by a subtracter 6*b*. A result of the arithmetic operation is obtained by a multiply operation of the positional deviation by a gain KP. The gain KP varies depending upon the positional deviation. A value of the gain KP may be stored in a look-up table not shown.

The speed calculator 6*d* computes the speed of the carriage 3 on the basis of the output pulses ENC-A and ENC-B from the encoder 11. The speed is obtained in a manner as explained below. First, rising edges and tail edges of output pulses ENC-A, ENC-B of the encoder 11 are detected, and the duration of time between edges corresponding to ¼ of the slit interval of the coding plate 12 is counted by a timer counter, for example. When the count value is T and the slit interval of the coding plate 12 is λ, the speed of the carriage is obtained as $\lambda/(4T)$. Note here that operation of the speed is performed by measuring one period of output pulses ENC-A, e.g., from a rising edge to the next rising edge, by means of a timer counter.

The subtracter 6*e* operates speed difference between the target speed and the actual speed of the carriage 3 operated by the speed operator 6*d*.

The proportional element 6*f* multiplies the speed difference by a constant Gp, and outputs its multiplication result. The integral element 6*g* cumulates products of speed differences and a constant Gi. The differential element 6*h* multiplies the difference between the current speed difference and its preceding speed difference by a constant Gd, and outputs its multiplication result. Operations of the proportional element 6*f*, the integral element 6*g* and the differential element 6*h* are conducted in every period of output pulses ENC-A of the encoder 11, synchronizing with the rising edge of each output pulse ENC-A, for example.

Outputs of the proportional element 6*f*, the integral element 6*g* and the differential element 6*h* are added in the adder 6*i*. Then, the result of the addition, i.e., the drive current of the CR motor 4, is sent to the D/A converter 6*j* and converted into an analog current. Based on this analog current, the CR motor 4 is driven by the driver 5.

The timer 6*k* and the acceleration controller 6*m* are used for controlling acceleration whereas PID control using the proportional element 6*f*, the integral element 6*g* and the differential element 6*h* is used for constant speed and deceleration, control during acceleration.

The timer 6*k* generates a timer interrupt signal every predetermined interval in response to a clock signal sent from the CPU 16.

The acceleration controller 6*m* cumulates a predetermined current value (for example 20 mA) to the target current value every time it receives the timer interrupt signal, and results of the integration, i.e, target current values of the DC motor during acceleration, are sent to the D/A converter 6*j* from time to time. Similarly to PID control, the target current value is converted into an analog current by the D/A converter 6*j*, and the CR motor 4 is driven by the driver 5 according to this analog current.

The driver 5 has four transistors, for example, and it can create (a) a drive mode for rotating the CR motor 4 in the normal or reverse direction; (b) a regeneration brake drive mode (a short brake drive mode, which is the-mode maintaining a halt of the CR motor); and (c) a mode for stopping the CR motor, by turning those transistors ON or OFF in accordance with outputs from the D/A converter 6*j*.

Next explained is the performance of the DC unit 6, that is, the conventional DC motor control method, with reference to FIGS. 8A and 8B.

While the CR motor 4 stops, when a start instruction signal for starting the CR motor 4 is sent from the CPU 16 to the DC unit 6, a start initial current value $I_n$ is sent from the acceleration controller 6*m* to the D/A converter 6*j*. This start initial current value $I_0$ is sent together with the start instruction signal from the CPU 16 to the acceleration controller 6*m*. Then, this current value $I_0$ is converted into an analog current by the D/A converter 6*j* and sent to the driver 5 which in turn start the CR motor 4 (see FIGS. 8A and 8B). After the start instruction signal is received, the timer interrupt signal is generated every predetermined interval from the timer 6*k*. The acceleration controller 6*m* cumulates a predetermined current value (for example, 20 mA) to the start initial current value $I_0$ every time it receives the timer interrupt signal, and sends the cumulated current value to the D/A converter 6*j*. Then, the cumulated current value is converted into an analog current by the D/A converter 6*j* and sent to the driver 5. Then, the CR motor is driven by the driver 5 so that the value of the current supplied to the CR motor 4 becomes the cumulated current value mentioned above, and the speed of the CR motor 4 increases (see FIG. 8B). Therefore, the current value supplied to the CR motor 4 represents a step-like aspect as shown in FIG. 8A. At that time, the PID control system also works, but the D/A converter 6*j* selects and employs the output from the acceleration controller 6*m*.

Cumulative processing of current values of the acceleration controller 6*m* is continued until the cumulated current value reaches a fixed current value $I_s$. When the cumulated current value reaches the predetermined value $I_s$ at time t1, the acceleration controller 6*m* stops its cumulative processing, and supplies the fixed current value $I_s$ to the D/A converter 6*j*. As a result, the CR motor 4 is driven by the driver 5 such that the value of the current supplied to the CR motor 4 becomes the current value $I_s$ (see FIG. 8A).

In order to prevent the speed of the CR motor 4 from overshooting, if the speed of the CR motor 4 increases to a predetermined value V1 (see time t2), the acceleration controller 6*m* makes a control to reduce the current supplied to the CR motor 4. At that time, the speed of the CR motor 4 further increases, but when it reaches a predetermined speed Vc (see time t3 of FIG. 8B), the D/A converter 6*j* selects the output of the PID control system, i.e., the output of the adder 6*i*, and PID control is effected.

That is, based on the positional difference between the target position and the actual position obtained from the output of the encoder 11, the target speed is operated, and based on the speed difference between this target speed and the actual speed obtained from the output of the encoder 11, the proportional element 6*f*, the integral element 6*g* and the differential element 6*h* act to perform proportional, the integral and the differential operations, respectively, and based on the sum of results of these operations, the CR motor 4 is controlled. These proportional, integral and differential operations are conducted synchronously with the rising edge of the output pulse ENC-A of the encoder 11, for example. As a result, speed of the DC motor 4 is controlled to be a desired speed Ve. The predetermined speed Vc is preferably a value corresponding to 70 through 80% of the desired speed Ve.

From time t4, the DC motor 4 reaches the desired speed, and the carriage 3 also reaches the desired constant speed Ve and can perform printing.

When the printing is completed and the carriage 3 comes close to the target position (see time t5 in FIG. 8B), the positional difference becomes smaller, and the target speed also becomes slower. Therefore, the speed difference, i.e., the output of the subtracter 6*e* becomes a negative value, and the DC motor 4 is decelerated and stops at time t6.

However, since the conventional motor control method and control apparatus electrically feed the motor until the subject to be driven by the motor (motor-driven subject) reaches its target stop position, they involved the problem that fluctuation in motor speed reflected on the positioning accuracy of the stop position of the subject to be driven, and if large, it degraded the positioning accuracy of the stop position of the subject to be driven.

Additionally, the conventional motor control method and control apparatus involved another problem explained below specifically.

In a printer using the conventional motor control apparatus having the above-explained structure, paper feeding is effected by the paper-feeding roller 65 driven by the PF motor 1 and the follower roller 66 as already explained with reference to FIGS. 5 and 6. The follower roller 66 is configured to urge the paper sheet 50 onto the paper-feeding roller 65 during the paper feeding motion with the aid of the spring 80 as shown in FIG. 9.

On the other hand, there is an increasing demand for printing over a wider area of the paper sheet 50 including portions nearest to its perimeters. For this purpose, it is necessary to hold a perimeter of the sheet 50 with the paper feeding roller 65 and the follower roller 66 within a predetermined extent x (for example, within 0.25 mm from the front to the back of a line connecting the centers of the paper feeding roller 65 and the follower roller 66).

However, in printers using conventional motor control apparatuses, since the follower roller 66 is urged toward the paper feeding roller 65 with a spring 80, if the perimeter of the sheet 50 is positioned within the predetermined extent while the sheet 50 is transported, a force F (see FIG. 10) tending to send out the sheet 50 is applied to the sheet 50 from the spring 80. Therefore, the sheet 50 is sent out from between the paper feeding roller 65 and the follower roller 66, and printing on the sheet 50 near the perimeter is not possible.

SUMMARY OF THE INVENTION

It is therefore the first object of the invention to provide a motor control apparatus ad a motor control method having a high positioning accuracy for the stop position of a subject to be driven by a motor motor-driven subject).

A motor control apparatus according to the invention is characterized in comprising a stop position prediction controller for instructing deenergization of a motor a predetermined period of time later than arrival of a subject to be driven by the motor at a predetermined position, the predetermined period of time corresponding to a predetermined condition upon arrival of the subject to be driven at the predetermined position, and the predetermined position being at a predetermined distance before a target stop position of the subject to be driven.

In a more specific configuration, the motor control apparatus according to the invention is characterized in comprising a stop position prediction controller for instructing deenergization of a motor a predetermined period of time later than arrival of a subject to be driven by the motor at a speed measuring position, the predetermined period of time corresponding to a current speed of the motor upon arrival of the subject to be driven at the speed measuring position, and the speed measuring position being at a predetermined distance before a target stop position of the subject to be driven. This configuration makes it possible to prevent influences to the positioning accuracy for the stop position of the subject to be driven from fluctuations of the motor speed and improve the positioning accuracy for the stop position of the subject to be driven.

The predetermined period of time may be determined to be in an extent that ensures deenergization of the motor is instructed before arrival of the subject to be driven at the target stop position.

In a furthermore specific configuration, the motor control apparatus according to the invention is characterized in comprising a position calculator for calculating and outputting a current position of a subject to be driven by a motor on the basis of encoder pulses output from an encoder in response to rotation of the motor; a speed calculator for calculating and outputting a current speed of the-motor on the basis of the encoder pulses; and a stop position prediction controller for outputting a deenergization instruction signal, which instructs deenergization of the motor, a predetermined period of time later than arrival of the subject to be driven at a speed measuring position, the predetermined period of time corresponding to the current speed of the motor upon arrival of the subject to be driven at the speed measuring position, and the speed measuring position being at a predetermined distance before a target stop position of the subject to be driven.

The predetermined period of time is determined to be in an extent that ensures the deenergization instruction signal is output before arrival of the subject to be driven at the target stop position.

The motor control apparatus according to the invention may further comprise a data storage portion for storing data on relations between the current speed of the motor upon arrival of the subject to be driven at the speed measuring position and the predetermined period of time.

The stop position prediction controller may measure the predetermined period of time by counting the number of the encoder pulses. Alternatively, the stop position prediction controller may measure the predetermined period of time by counting the number of pulses of a predetermined clock.

Destination of the deenergization instruction signal may be a drive signal generator that generates a drive signal for rotatably driving the motor.

The predetermined period of time is determined to a value that ensures the subject to be driven stops at the target stop position.

The predetermined period of time varies substantially in reverse proportion to the current speed of the motor upon arrival of the subject to be driven at the speed measuring position.

A motor control method according to the invention is characterized in instructing deenergization of a motor a predetermined period of time later than arrival of a subject to be driven by the motor at a predetermined position, the predetermined period of time corresponding to a predetermined condition upon arrival of the subject to be driven at the predetermined position, and the predetermined position being at a predetermined distance before a target stop position of the subject to be driven.

In a more specific configuration, the motor control method according to the invention is characterized in instructing deenergization of a motor a predetermined period of time later than arrival of a subject to be driven by the motor at a speed measuring position, the predetermined period of time corresponding to a current speed of the motor upon arrival of the subject to be driven at the speed measuring position, and the speed measuring position being at a predetermined distance before a target stop position of the subject to be driven. This configuration makes it possible to prevent influences to the positioning accuracy for the stop position of the subject to be driven from fluctuations of the motor speed and improve the positioning accuracy for the stop position of the subject to be driven.

In a furthermore specific configuration, a motor control method according to the invention is characterized in comprising a first process for measuring a current position of a subject to be driven by a motor and monitoring whether the subject to be driven has reached a speed measuring position at a predetermined distance before a target stop position of the subject to be driven; a second process for measuring the current speed of the motor upon arrival of the subject to be driven at the speed measuring position; a third process for determining a predetermined period of time corresponding to the current speed of the motor upon arrival of the subject to be driven at the speed measuring position; and a fourth step for instructing deenergization of the motor the predetermined period of time later than arrival of the subject to be driven at the speed measuring position.

For the purpose of determining the predetermined period of time, data may be previously collected and stored concerning relations between the current speed of the motor upon arrival of the subject to be driven at the speed measuring position and the predetermined period of time.

The predetermined period of time is determined to be in an extent that ensures deenergization of the motor is instructed before arrival of the subject to be driven at the target stop position.

The predetermined period of time is determined to a value that ensures the subject to be driven stops at the target stop position.

The predetermined period of time varies substantially in reverse proportion to the current speed of the motor upon arrival of the subject to be driven at the speed measuring position.

The predetermined period of time may be measured by counting the number of the encoder pulses. Alternatively, The predetermined period of time may be measured by counting the number of pulses of a predetermined clock.

In the motor control apparatus and the motor control method according to the invention, the motor to be controlled may be a DC motor, a stepping motor, AC motor.

Further, the motor to be controlled may be a paper feeding motor of a printer or a carriage motor of a printer.

The second object of the invention is to provide a motor control apparatus and a motor control method for controlling paper feeding in a manner enabling printing over a wider area of a sheet to near its perimeters.

The motor control apparatus according to the invention includes a position detector for detecting the position of paper driven by a paper feeding motor on the basis of output pulses of an encoder that rotates in response to rotation of the paper feeding motor; and a drive controller for controllably driving the paper feeding motor by additionally applying a current value to the paper feeding motor on the basis of a target value of the paper feeding amount and an output of the position detector, and it is characterized in generating a current value signal that causes the paper to stop or rotate in the opposite direction from a normal paper feeding direction in response to output pulses of the encoder after arrival of the paper feeding amount reaches the target value, and controllably driving the paper feeding motor with the driving controller in response to the current value signal.

The motor control apparatus according to the invention may further comprise a pulse counter for counting output pulses of the encoder during movement of the paper in the reverse direction from the normal paper feeding direction after the feeding amount of the paper reaches the target feeding value and for outputting an instruction signal when the count value reaches a predetermined value; and a current value signal generator for generating the current value signal upon receipt of the instruction signal or during movement of the paper in the reverse direction from the normal paper feeding direction.

The current value signal generator may include a detector for detecting whether the paper remains still, or is moving in the reverse direction from the normal paper feeding direction, in response to outputs from the encoder; and a current value determiner for determining and outputting the current value signal in response to the instruction signal or a result of detection by the detector.

The current value determiner may output the same current value signal as the latest current value signal when the paper remains still, and generate a current value signal that is smaller in absolute value than the latest current value signal but equal in sign when the paper is moving in the reverse direction from the normal paper feeding direction.

Further, the motor control method according to the invention is characterized in comprising the steps of: generating a current value signal causing paper to stop or move in the opposite direction from a normal paper feeding direction in response to output pulses given from an encoder after the paper feeding amount reaches a target feeding value, said encoder rotating in response to ration of a paper feeding motor; and controllably driving said paper feeding motor in response to said current value signal.

The step of generating the current value signal may include the steps of: counting output pulses of the encoder during movement of the paper in the reverse direction from the normal paper feeding direction; and generating the current value signal when the count value of the output pulses reaches a predetermined value.

Furthermore, the recording medium of a computer program according to the invention is characterized in having recorded a computer program for executing in a computer system one of the above-summarized motor control methods according to the invention.

DESCRIPTION OF THE PREFERRED EMBODIMENTS

Embodiments of the motor control apparatus and the motor control method according to the invention will be explained below with reference to the drawings.

Figure 11:
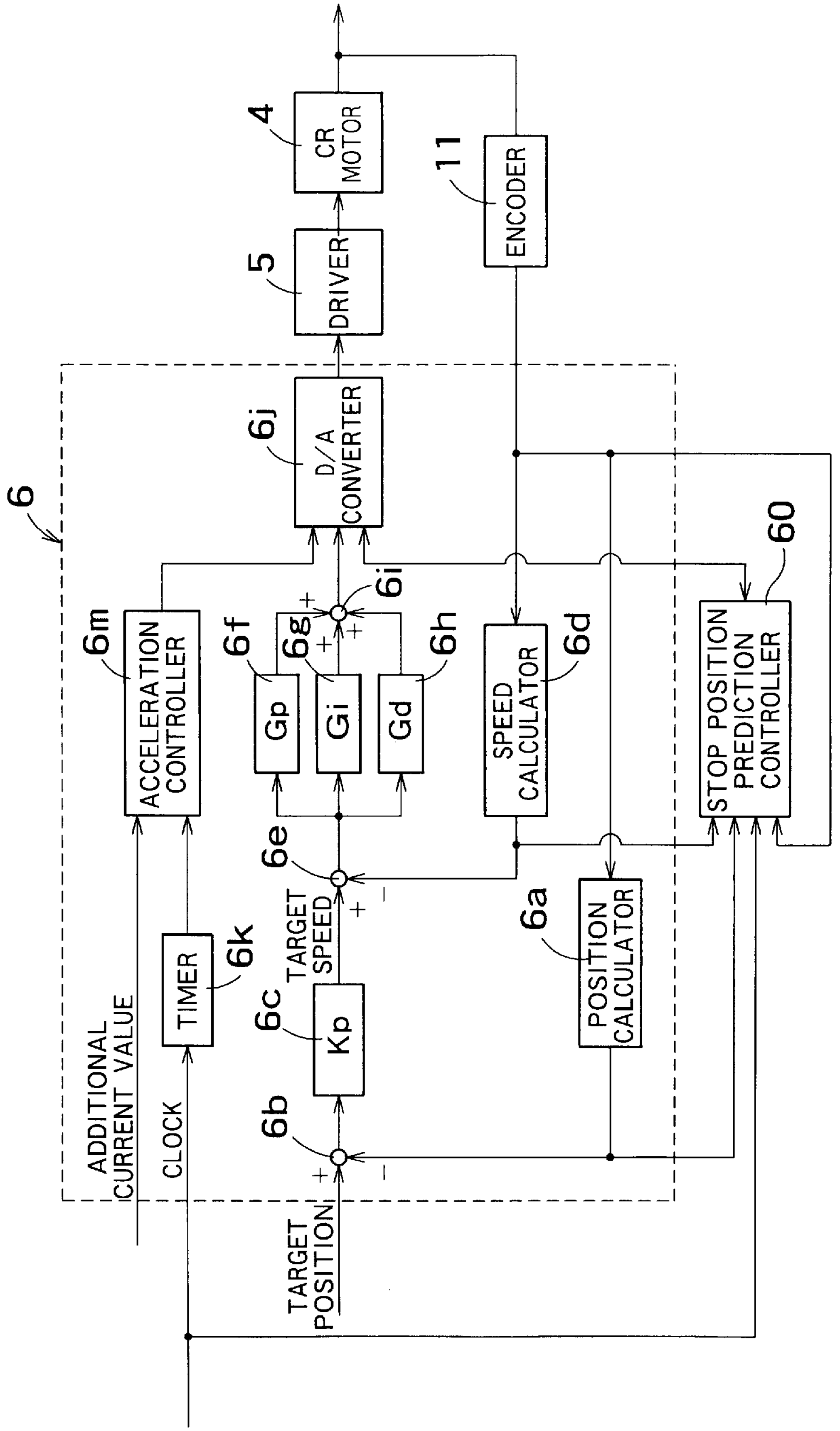
FIG. 11 is a block diagram that shows configuration of a motor control apparatus according to the first embodiment of the invention.
Figure 12:
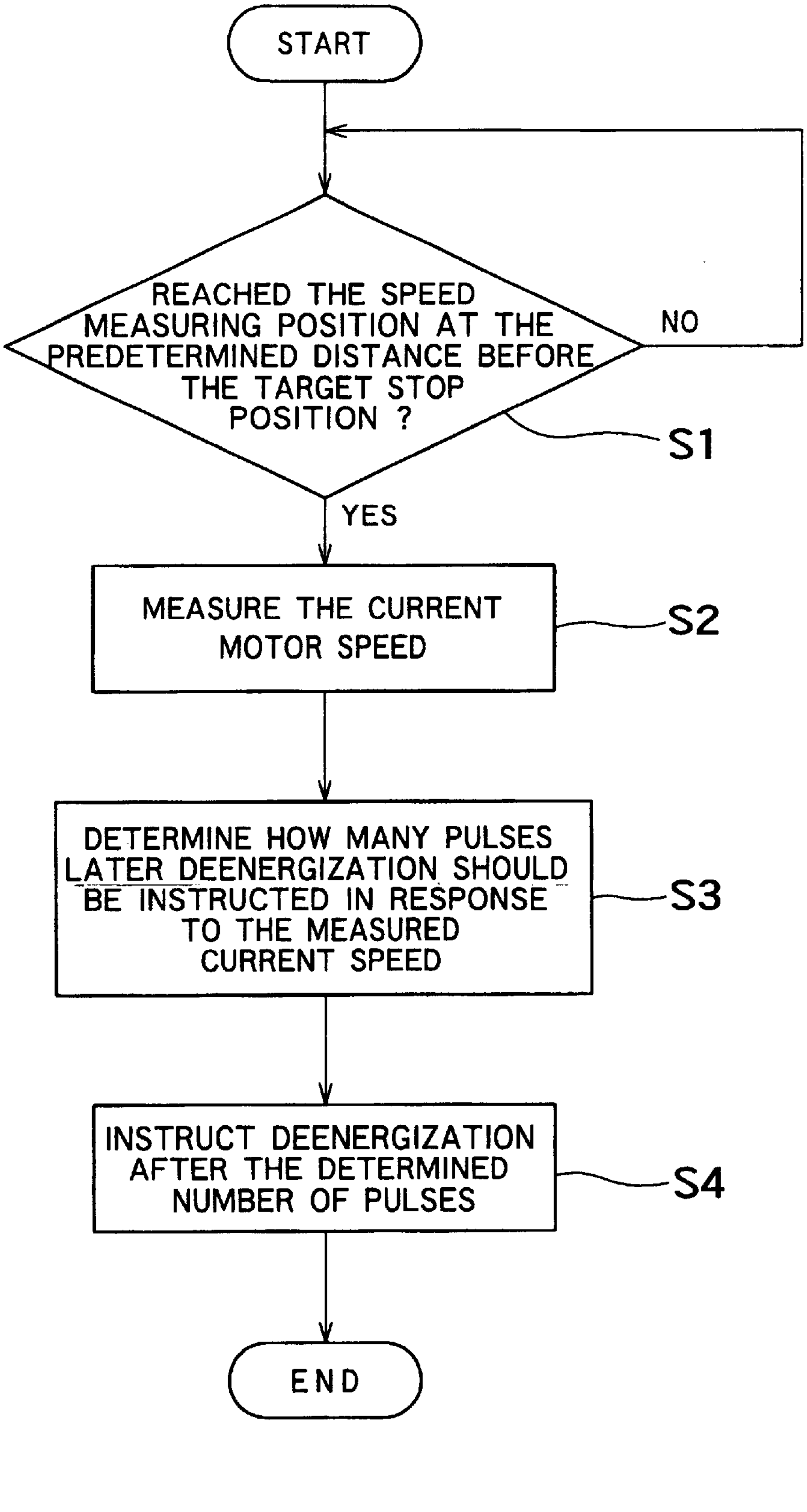
FIG. 12 is a flow chart that shows procedures of a motor control method according to the first embodiment of the invention.
Figure 13:
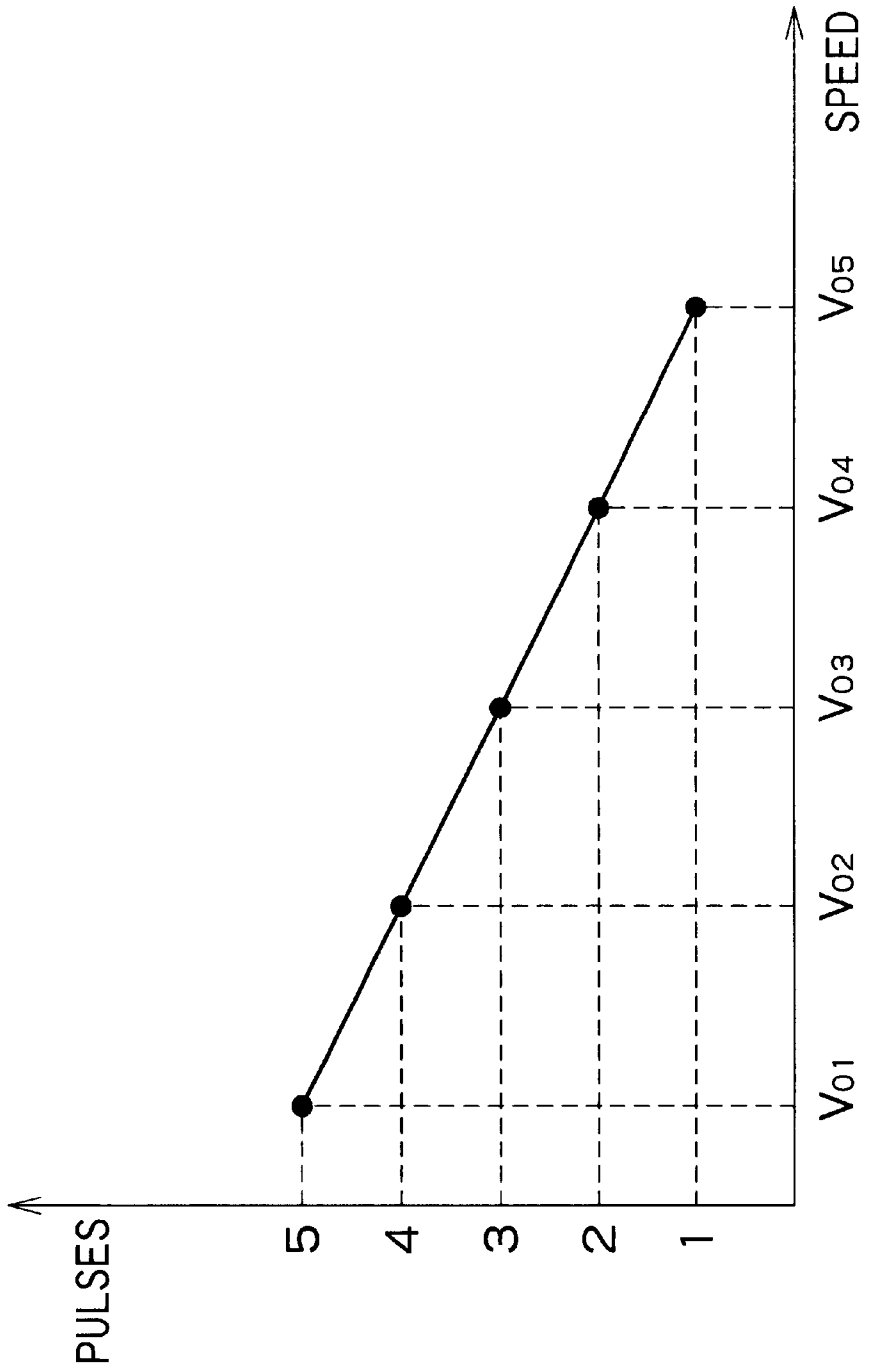
FIG. 13 is a graph that shows a relation between the current speed of the motor at a speed measuring position and the time (number of pulses) for instructing deenergization.

FIG. 11 is a block diagram that shows configuration of a motor control apparatus according to the first embodiment of the invention, FIG. 12 is a flow chart that shows procedures of a motor control method according to the first embodiment of the invention, and FIG. 13 is a graph that shows a relation between the current speed of the motor at a speed measuring position and the time (number of pulses) for instructing deenergization.

The motor control apparatus and the motor control method according to the first embodiment of the invention are configured to predetermine a speed measuring position upstream of a target stop position of a motor-driven subject by a predetermined distance and then instruct deenergization of the motor after a period of time corresponding to the current speed of the motor that is measured when the motor-driven subject reaches the speed measuring position. That is, it is precisely predicted from the current speed of the motor upon arrival of the motor-driven subject at the speed measuring position at which point of time, before arrival at the target stop position of the subject to be driven, the motor should be energized to ensure that the motor-driven subject stops just at the target stop position, and deenergization of the motor is instructed at the point of time determined by the prediction. The time from measurement of the current speed of the motor to the instruction of deenergization of the motor is measured with the number of encoder pulses or the number of clock pulses.

Configuration of the motor control apparatus according to the first embodiment of the invention shown in FIG. 11 is for the case in which the motor to be controlled is a DC motor. More specifically, a stop position prediction controller 60 is added to a typical DC unit 6, and the stop position prediction controller 60 is supplied with outputs of a position calculator 6*a* and a speed calculator 6*d* and an output of and encoder 11 or a clock. Although FIG. 11 illustrates that the stop position prediction controller 60 is supplied with both an output of the encoder 11 and a clock, it may be configured, if necessary, to be supplied with one of the output of the encoder 11 and the clock. The stop position prediction controller 60 has the function as a counter to measure a period of time by means of the number of encoder pulses or the number of clock pulses.

Referring to FIGS. 11, 12 and 13, behaviors of the motor control apparatus according to the first embodiment of the invention, that is, procedures of the motor control method according to the first embodiment of the invention, will explained sequentially.

Figure 1:
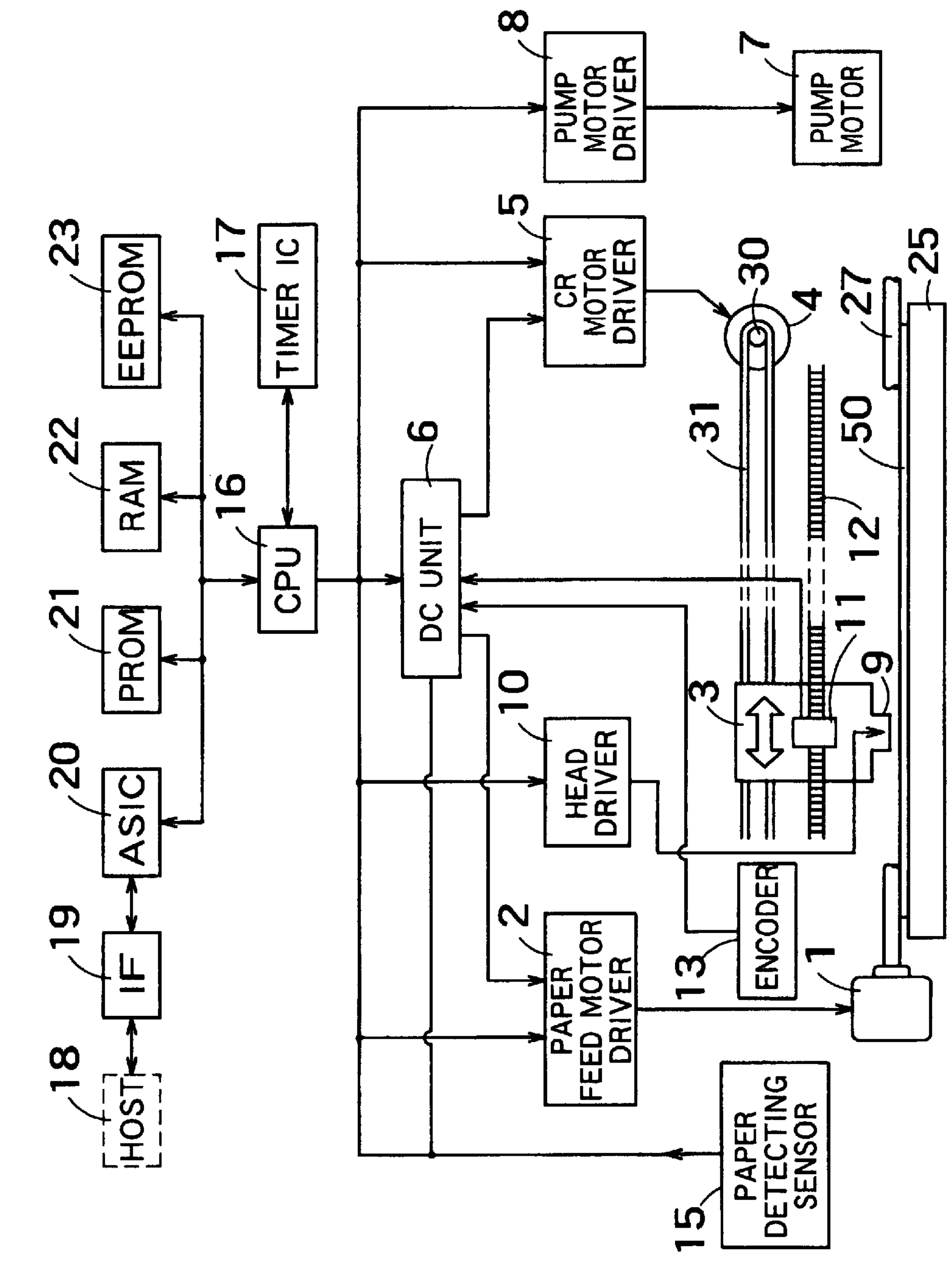
FIG. 1 PRIOR ART
FIG. 1 is a block diagram that roughly shows configuration of an ink jet printer.
Figure 2:
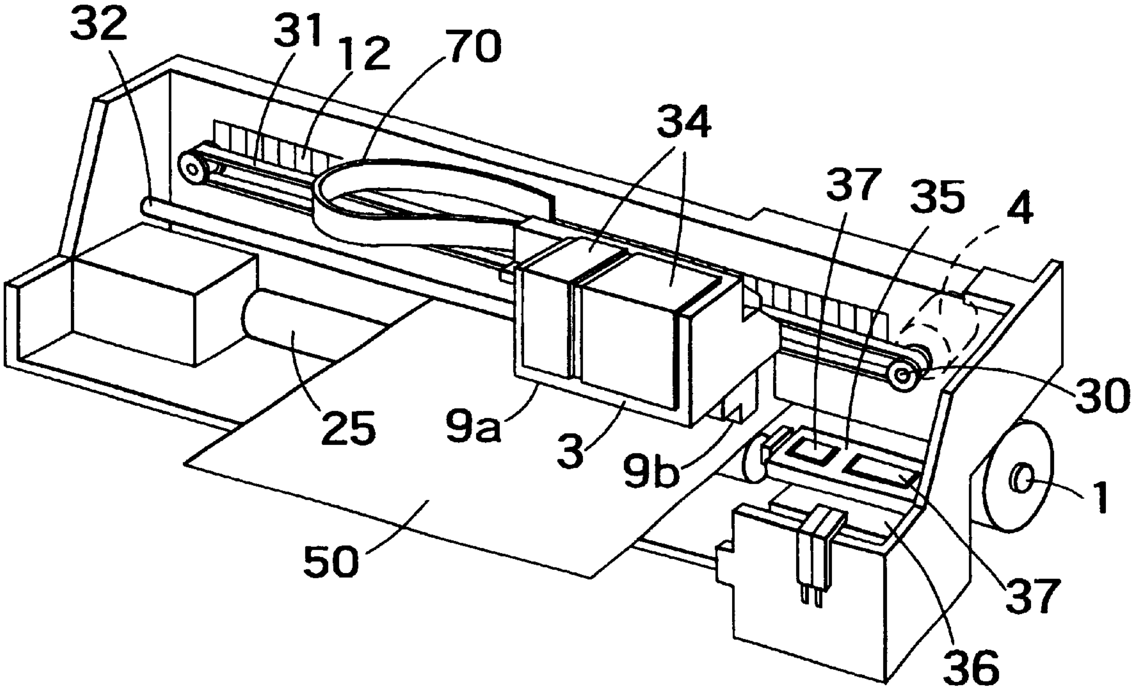
FIG. 2 PRIOR ART
FIG. 2 is a perspective view that shows configuration of a carriage 3 and its periphery of an ink jet printer.
Figure 3:
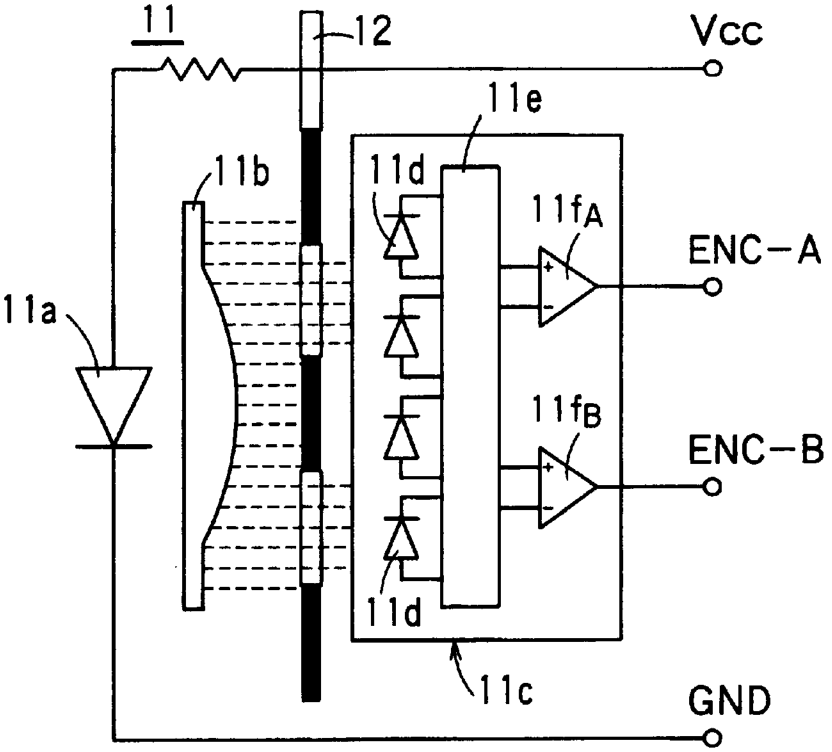
FIG. 3 PRIOR ART
FIG. 3 is an explanatory diagram that schematically shows configuration of a linear encoder 11 attached to the carriage 3.
Figure 4A:
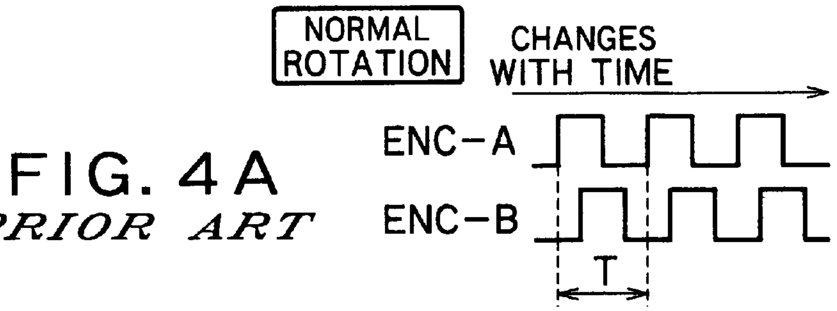
FIG. 4A PRIOR ART
FIGS. 4A and 4B are timing charts that show waveforms of two output signals from the encoder during normal rotation of a CR motor and during reverse rotation of the same.
Figure 4B:
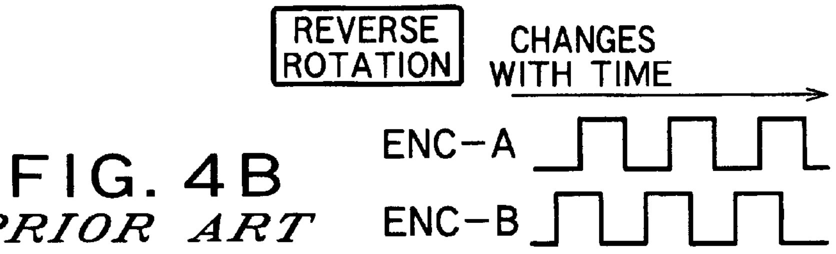
FIG. 4B PRIOR ART
Figure 5:
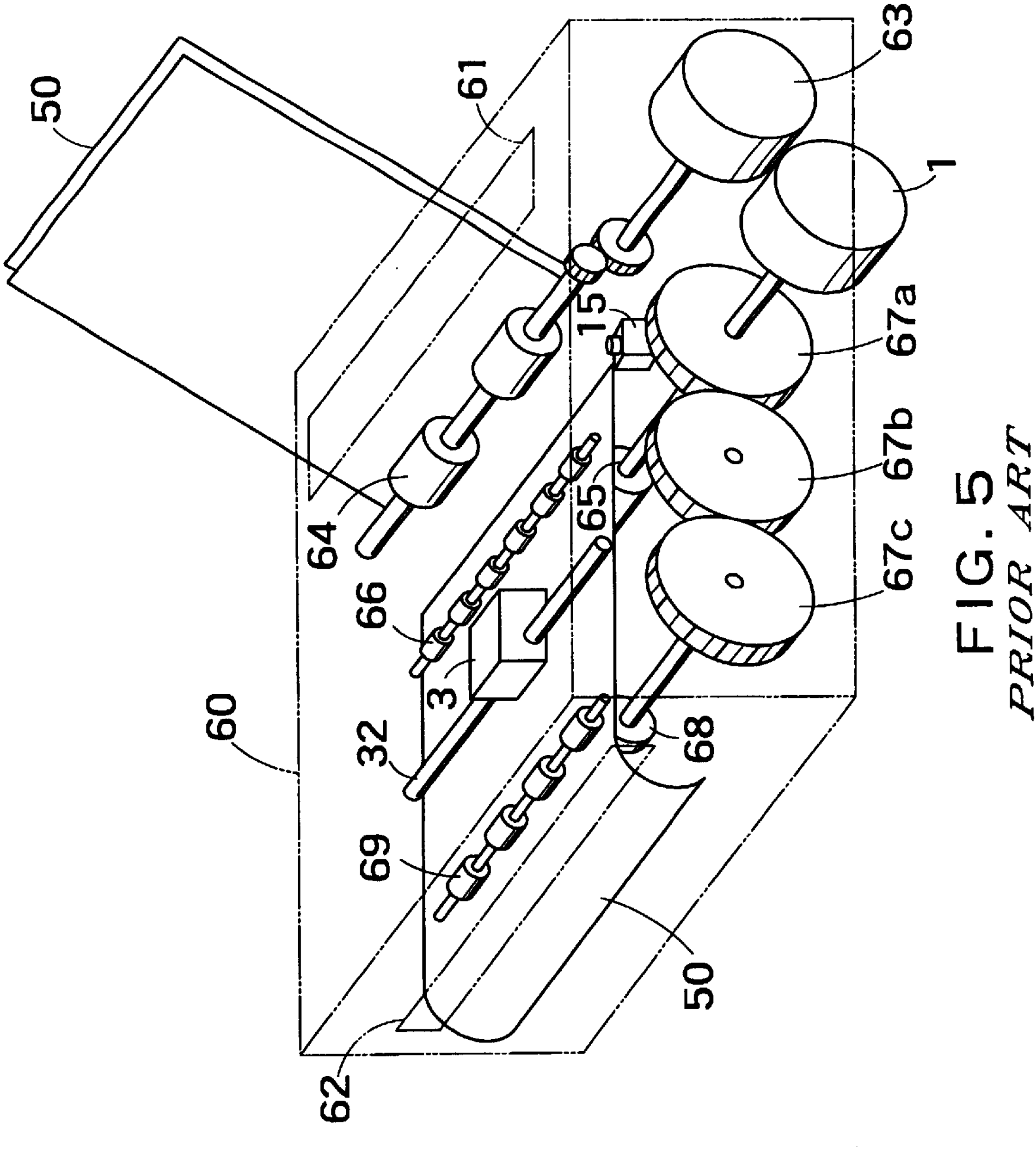
FIG. 5 PRIOR ART
FIG. 5 is a perspective view that shows components related to feeding and detection of paper.
Figure 6:
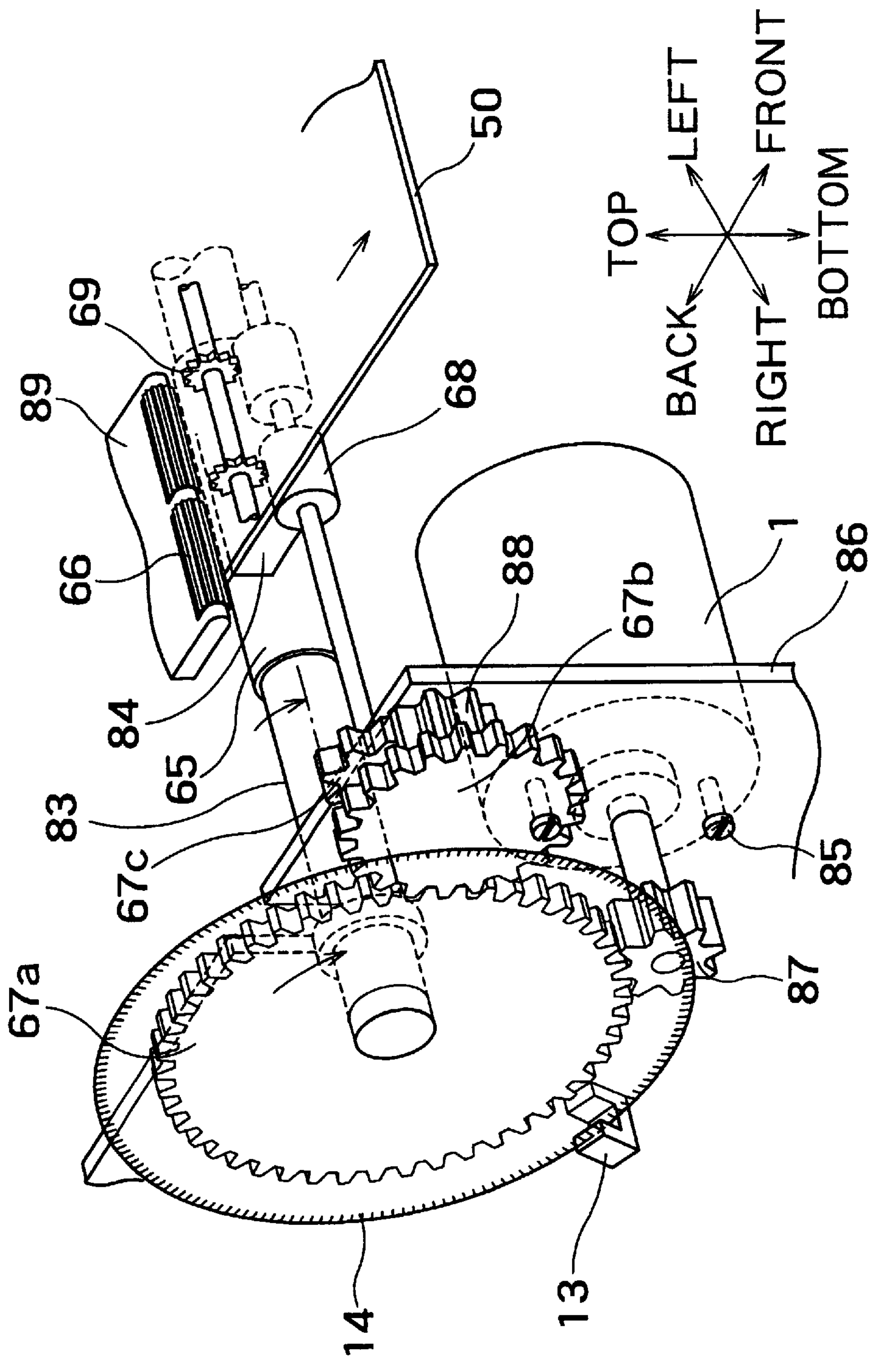
FIG. 6 PRIOR ART
FIG. 6 is a perspective that shows details of components related to feeding of paper of a printer.

Upon carrying out the motor control apparatus and the motor control method according to the first embodiment of the invention, a speed measuring position is previously determined upstream of a target stop position of a motor-driven subject by a predetermined distance. Additionally, in response to the current speed of the motor that is measured when the motor-driven subject reaches the speed measuring position, concerning how long in time after measurement of the current speed of the motor the motor should be energized to ensure the motor-driven subject stops just at the target stop position, sufficient data are collected by precise measurement through tests, simulation, and so on, and the data are previously stored in an appropriate means. A memory may be provided in the stop position prediction controller 60, for example, and the data may be stored in that memory. Alternatively, a memory may be provided outside the stop position prediction controller 60, and the data may be stored in the memory and may be read out into the stop position prediction controller 60. In case a memory is provided outside the stop position prediction controller 60, an exclusive memory may be provided to read out data therefrom into the stop position prediction controller 60, or the data may be stored in any of ASIC 20, PROM 21, RAM 22 and EPROM 23 shown in FIG. 1 such that data can be readout into the stop position prediction controller 60 through CPU 16.

The graph of FIG. 13 shows a relation between the current speed of the motor at a speed measuring position and the duration of time from measurement of the current speed of the motor to giving instruction of deenergization of the motor (which may be called, hereinafter, "deenergization instruction time" (number of pulses)). The deenergization instruction time is measured by means of the number of encoder pulses or the number of clock pulses, as stated above.

In this case, the speed is divided into five values, V01, V02, V03, V04 and V05 (V01<V02<V03<V04<V05). Then, the deenergization instruction time (number of pulses) is determined which division the measured current speed of the motor is contained in. More specifically, if the current speed of the motor at the speed measuring position is lower than V01, deenergization of the motor is instructed five pulses later; if higher than V01 and not higher than V02, four pulses later; if higher than V02 and not higher than V03, three pulses later; if higher than V03 and not higher than V04, two pulses later, if higher than V04 and not higher than V05, one pulse later; and if higher than V05, immediately.

If the deenergization instruction time is measured with the number of encoder pulses for collection of data through tests, simulation, or the like, then encoder pulses are used for measurement also during actual control operations. If the deenergization instruction time is measured with the number of clock pulses for collection of data through tests, simulation, or the like, then clock pulses are used for measurement also during actual control operations. This is because, although intervals of clock pulses are always constant as being set previously, encoder pulses vary with the current speed of the motor and need matching.

The stop position prediction controller 60 is used to measure the deenergization instruction time by way of the number of encoder pulses or the number of clock pulses, so it should have the function as a counter as stated above.

As explained above, after setting the speed measuring position, collecting data of the deenergization instruction time and storing the data, the motor control apparatus and the motor control method according to the invention are prepared for actual use.

After the motor drive control is started, the stop position prediction controller 60 monitors through output of the position calculator 6*a* whether the motor-driven subject has reached the speed measuring position or not (step S1). When arrival at the speed measuring position is confirmed, the stop position prediction controller 60 measures the current speed of the motor from the output of the speed calculator 6*d* (step S2).

After that, based on the data about the relation between the current speed of the motor at the speed measuring position and the deenergization instruction time, in response to the measured current speed of the motor, the stop position prediction controller 60 determines how many pulses later it should instruct deenergization of the motor, that is, determined the deenergization instruction time (step S3). Data on the relation between the current speed of the motor and the deenergization instruction time is always prepared for use by the stop position prediction controller 60.

The stop position prediction controller 60 starts measurement immediately after determining the deenergization instruction time. That is, it counts the number of pulses of the output of the encoder 11 or the clock, which is selected previously. When the count value of the pulses reaches the number of pulses corresponding to the determined deenergization instruction time, the stop position prediction controller 60 supplies a D/A converter 6*j* with a deenergization instruction signal that instructs deenergization of the motor (step S4). As a result, the motor is deenergized and decelerates, and the motor-driven subject stops at the target stop position. For more precise positioning of the motor-driven subject at the target stop position, a braking means such as short brake, for example, may be used in combination upon the stop control.

As explained above, since the motor control apparatus and the motor control method according to the first embodiment of the invention stop the motor and the motor-driven subject by measuring the current speed of the motor upon arrival of the motor-driven subject at the speed measuring position upstream of the target stop position of the motor-driven subject by a predetermined distance and controlling to instruct deenergization of the motor after the deenergization instruction time corresponding to the current speed of the motor at the position upstream of the target stop position of the motor-driven subject, it is possible to prevent influences from fluctuation in motor speed to the positioning accuracy about the stop position of the motor-driven subject and to improve the positioning accuracy regarding the stop position of the motor-driven subject.

The foregoing explanation has been made as the motor control apparatus according to the first embodiment of the invention being a DC motor control apparatus, i.e. as the motor to be controlled being a DC motor. However, the motor control apparatus and the motor control method are similarly applicable also when the motor to be controlled is a stepping motor, AC motor, or the like.

Also in those cases, procedures of the motor control method according to the first embodiment of the invention are the same, and the basic configuration of the motor control apparatus according to the first embodiment of the invention is the same. More specifically, the configuration includes a position calculator responsive to encoder pulses output from the encoder in response to rotation of the motor to calculate and output the current position of the motor-driven subject; a speed calculator responsive to the encoder pulses to calculate and output the current speed of the motor; and a stop position prediction controller responsive to outputs of the position calculator and the speed calculator to output the deenergization instruction signal that instructs deenergization of the motor a predetermined period of time later than arrival of the motor-driven subject at the speed measuring position, which corresponds to the current speed of the motor upon arrival of the motor-driven subject at the speed measuring position upstream of the target stop position of the motor-driven subject by a predetermined distance. Destination of the deenergization instruction signal is different depending upon the motor to be controlled, but it is always the same that the destination of the deenergization instruction signal is the drive signal generator that generates a drive signal for driving the motor. The drive signal generator is a component that corresponds to the D/A converter in the configuration in which the motor to be controlled is a DC motor.

In case the motor control apparatus and the motor control method according to the first embodiment of the invention are used in a printer, the motor to be controlled is mainly a paper feeding motor, but it may be a carriage motor as well.

Additionally, in case the motor control apparatus and the motor control method according to the first embodiment of the invention are used in a printer, the deenergization instruction time may be changed not only in accordance with the current speed of the motor upon arrival of the motor-driven subject at the speed measuring position, but also in accordance with other conditions such as remaining quantity of ink, nature of the printing paper, frequency of use of the printer, ambient temperature, ambient humidity, etc.

For example, in case the motor to be controlled is a paper feeding motor, sensors for detecting predetermined conditions to be used for changing the deenergization instruction time, such as nature of the printing paper, frequency of use of the printer, ambient temperature, ambient humidity, and so on, may be attached to the paper feeding mechanism. Regarding the nature of the printing paper, instead of detecting it with a sensor, it may be treated as one of predetermined conditions used for changing the deenergization instruction time on the part of the motor control apparatus, and the motor control apparatus may be preset in accordance with the printing paper to be used. In case the motor to be controlled is the carriage motor, sensors for detecting predetermined conditions used for changing the deenergization instruction time, such as remaining quantity of ink, frequency of use of the printer, ambient temperature, ambient humidity, and so on, are attached to the carriage 3.

Then, predetermined conditions detected by the sensors are sent to the stop position prediction controller 60, and the stop position prediction controller 60 first makes appropriate correction based on the predetermined conditions received before determining the deenergization instruction time in response to the current speed of the motor upon arrival of the motor-driven subject at the speed measuring position, and thereafter determines the deenergization instruction time.

Alternatively, predetermined conditions detected by the sensors may be sent to the memory storing data on the deenergization instruction time, and the data about the deenergization instruction time may be modified by correction based on the predetermined conditions. Thereby, the stop position prediction controller 60 determined the deenergization instruction time based on the data modified, in response to the current speed of the motor upon arrival of the motor-driven subject at the speed measuring position.

Therefore, conditions for determining the deenergization instruction time by the motor control apparatus and the motor control method according to the first embodiment of the invention are not limited to the current speed of the motor upon arrival of the motor-driven subject at the speed measuring position, but various conditions may be used. Means for detecting those conditions may be provided previously like the above-mentioned example.

More specifically, more generalized configuration of the motor control apparatus according to the first embodiment of the invention is characterized in comprising the stop position prediction controller that instructs deenergization of the motor after arrival of the motor-driven subject at a predetermined position upstream a target stop position of the motor-driven subject by a predetermined distance, by a predetermined period of time corresponding to a predetermined condition upon arrival of the motor-driven subject at the predetermined position. Similarly, more generalized configuration of the motor control method according to the first embodiment of the invention is characterized in instructing deenergization of the motor after arrival of the motor-driven subject at a predetermined position upstream a target stop position of the motor-driven subject by a predetermined distance, by a predetermined period of time corresponding to a predetermined condition upon arrival of the motor-driven subject at the predetermined position.

Next explained are a motor control apparatus and a motor control method according to the second embodiment of the invention with reference to FIGS. 14 through 17.

Figure 14:
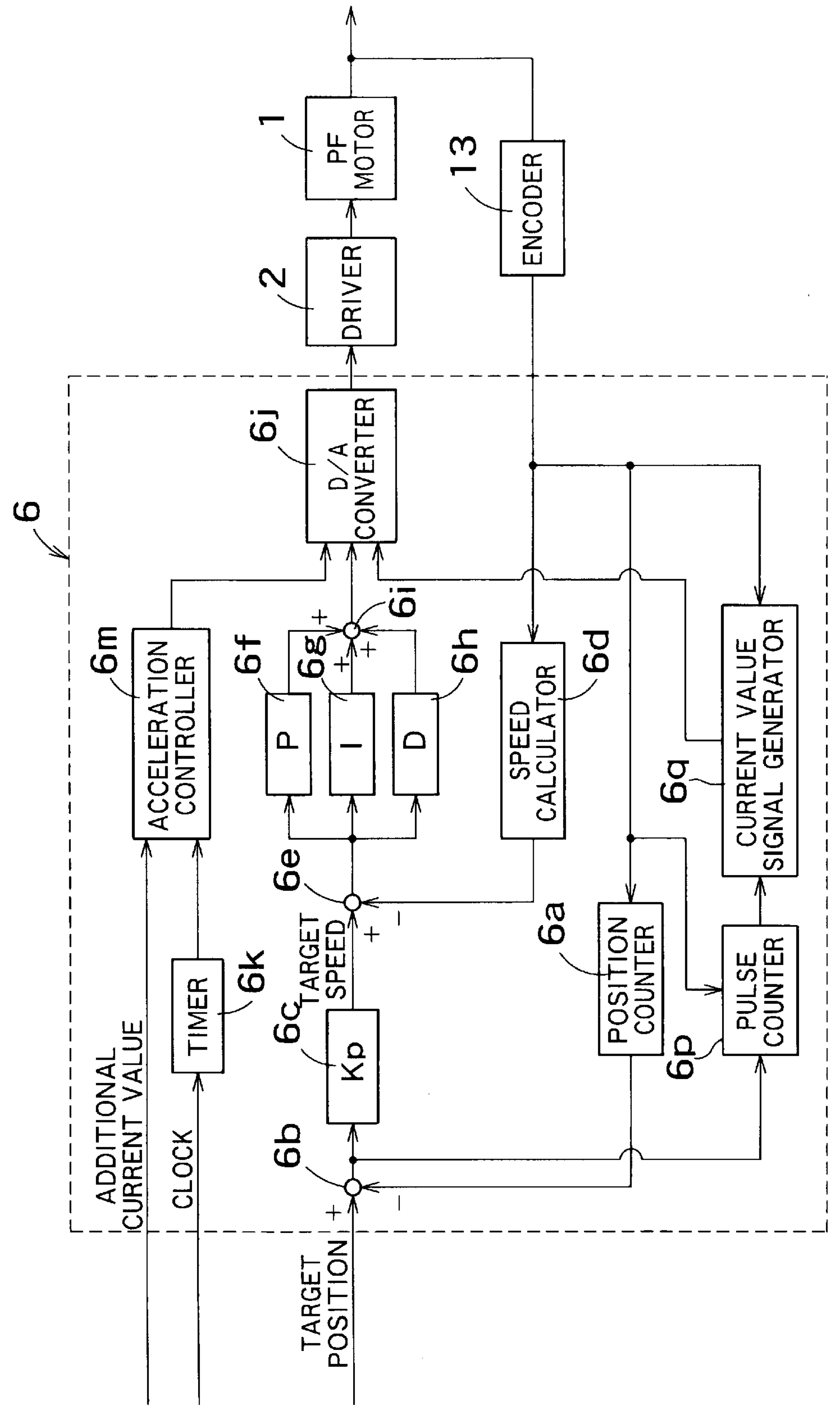
FIG. 14 is a block diagram that shows configuration of a motor control apparatus according to the second embodiment of the invention.
Figure 15:
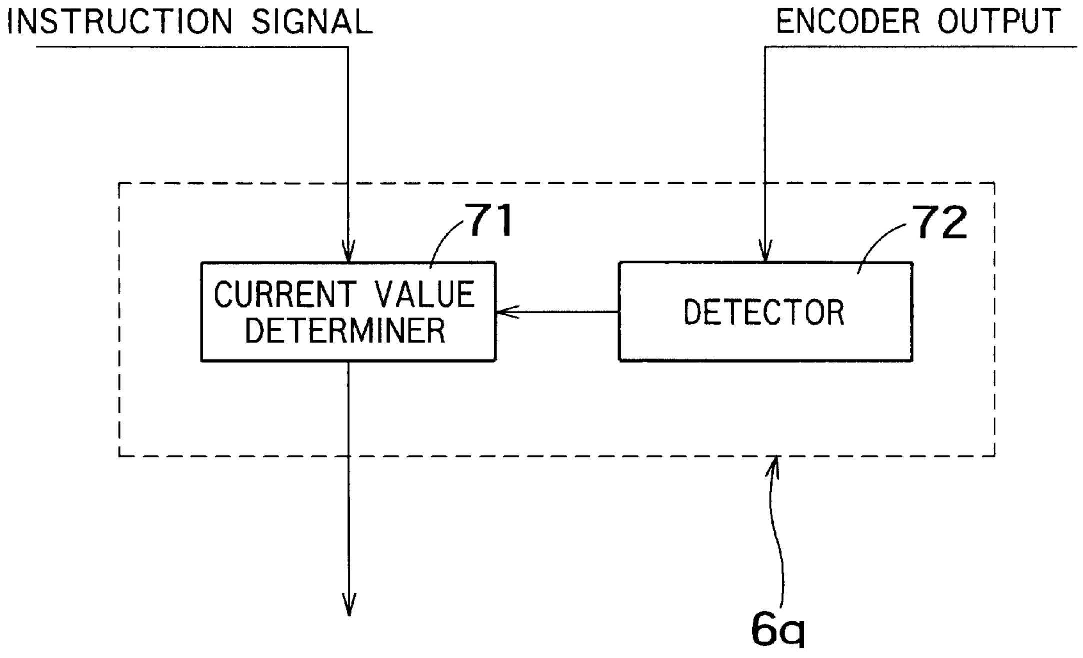
FIG. 15 is a block diagram that shows a specific example of a current value signal generator of the motor control apparatus according to the second embodiment of the invention.
Figure 16:
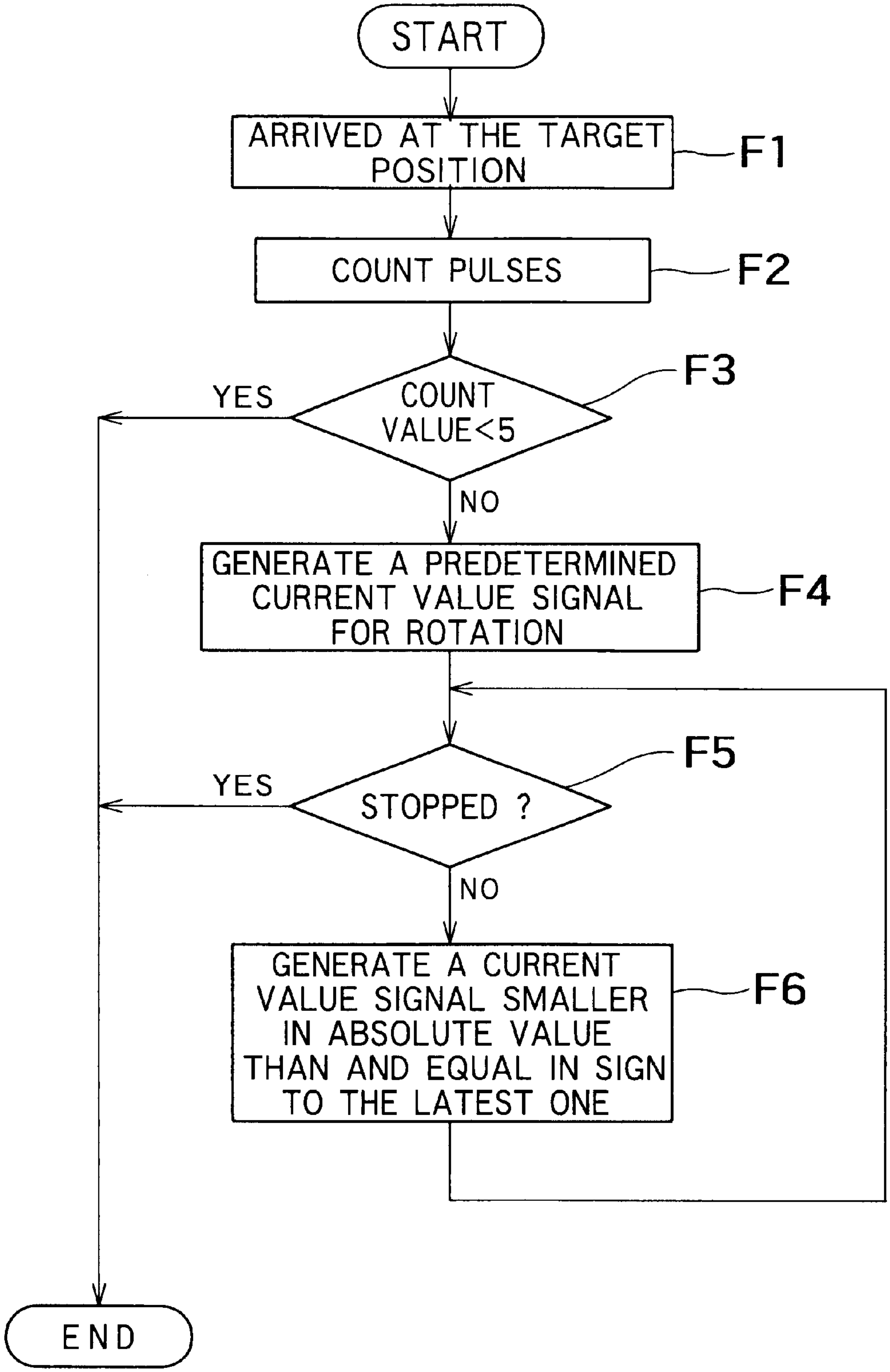
FIG. 16 is a flow chart that shows procedures of a motor control method according to the second embodiment of the invention.
Figure 17:
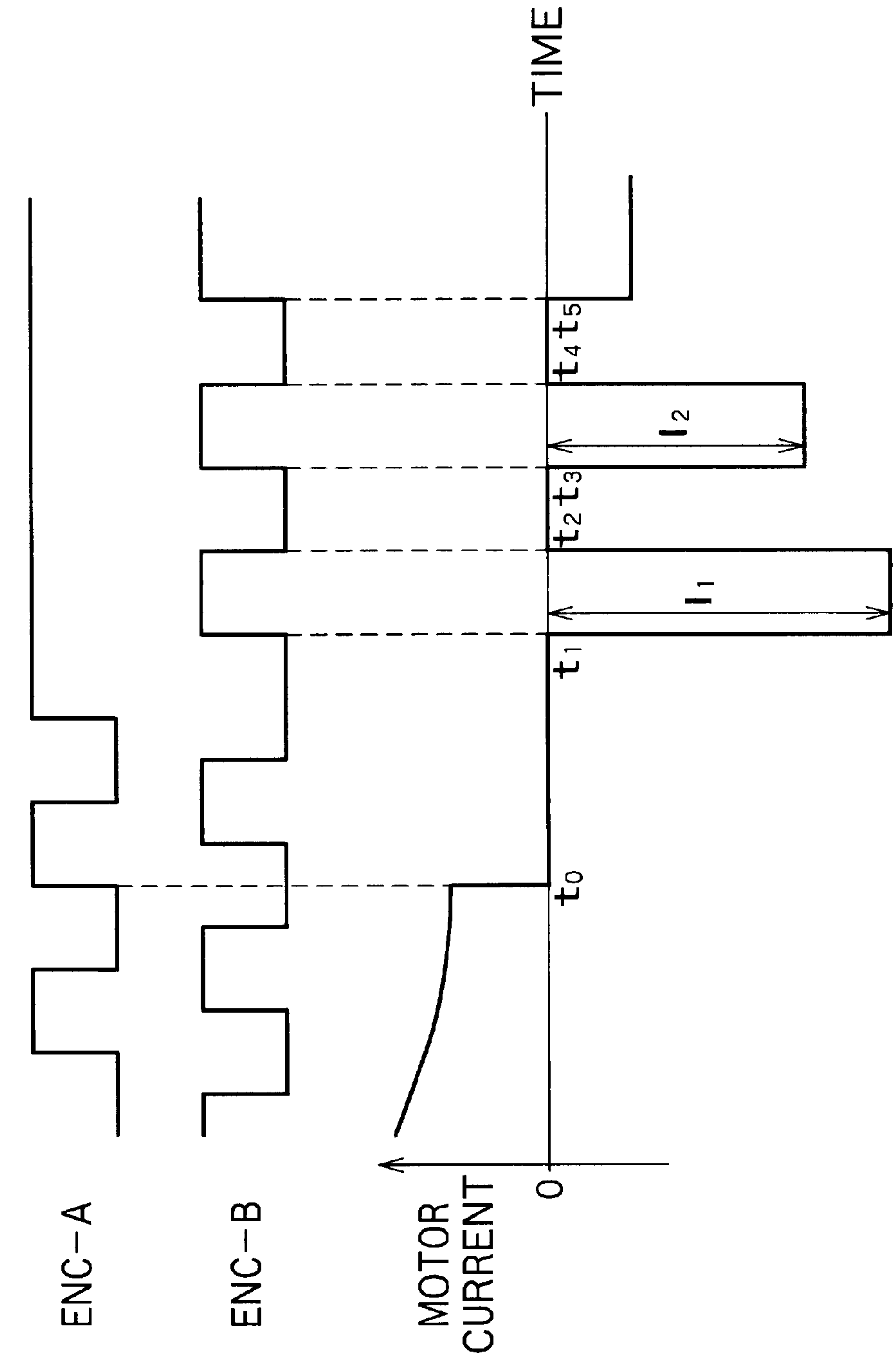
FIG. 17 is a timing chart that explains behaviors of the motor control device according to the second embodiment of the invention.

FIG. 14 is a block diagram that shows configuration of a motor control apparatus according to the second embodiment of the invention, and FIG. 15 is a block diagram that shows a specific example of a current value signal generator of the motor control apparatus according to the second embodiment of the invention. FIG. 16 is a flow chart that shows behaviors of the motor control apparatus according to the second embodiment of the invention, that is, procedures of a motor control method according to the second embodiment of the invention. FIG. 17 is a timing chart that explains behaviors of the motor control apparatus according to the second embodiment of the invention.

Figure 7:
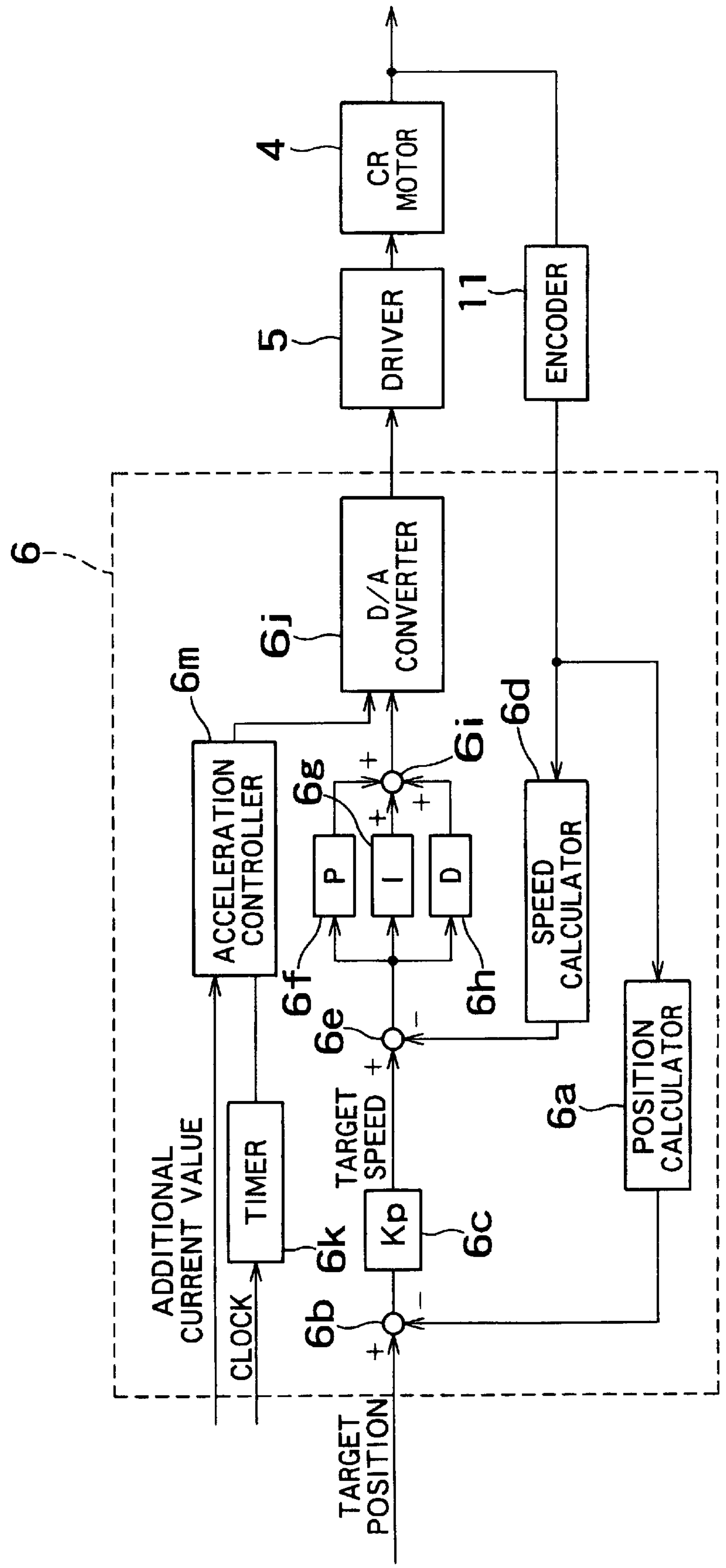
FIG. 7 PRIOR ART
FIG. 7 is a block diagram that shows configuration of a DC unit 6, which is a conventional DC motor control apparatus.
Figures 8A, 8B:
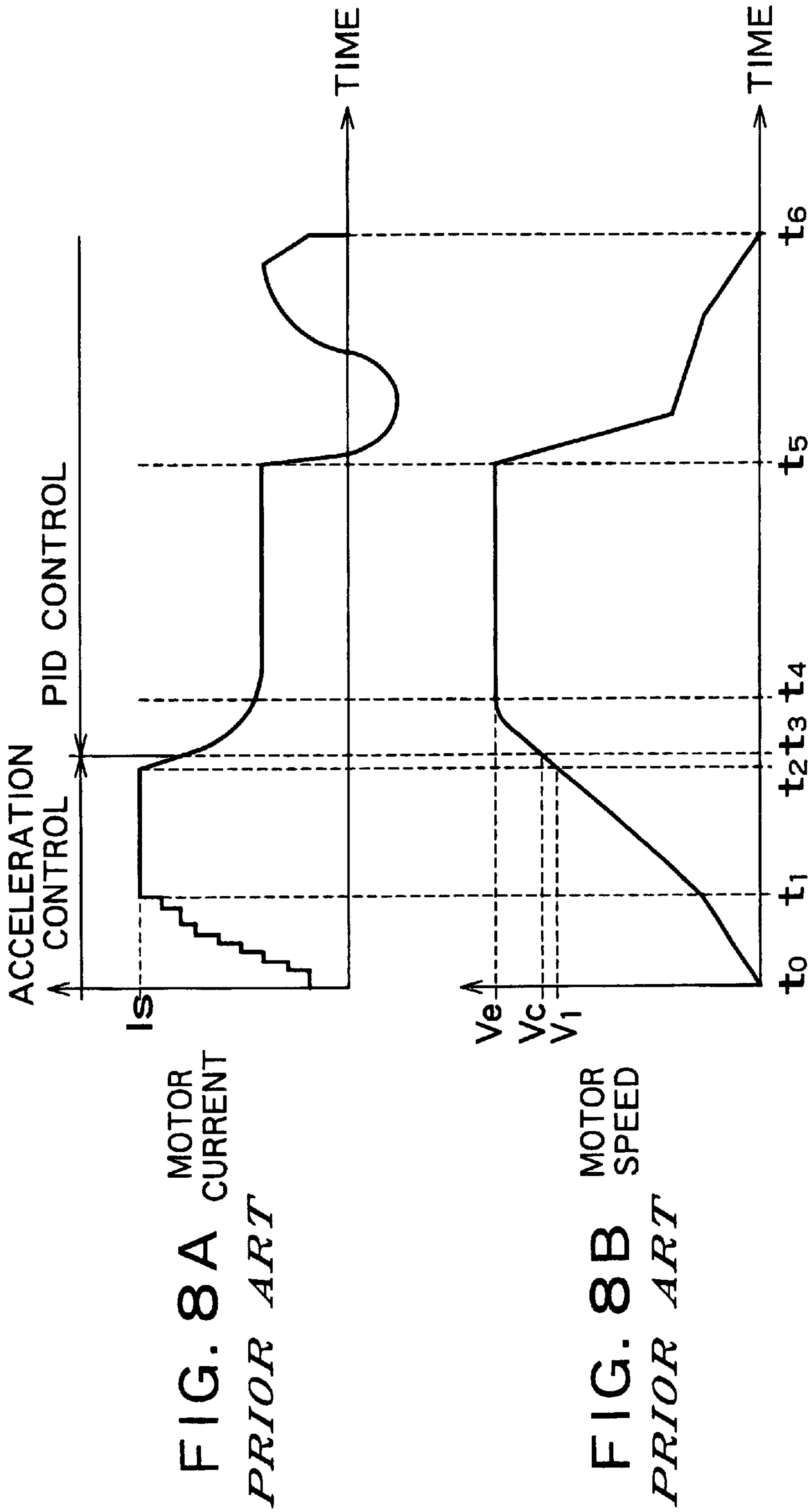
FIG. 8A PRIOR ART
FIG. 8B PRIOR ART
FIGS. 8A and 8B are graphs that show a motor current and a motor speed of a CR motor 4 controlled by the DC unit 6.
Figure 9:
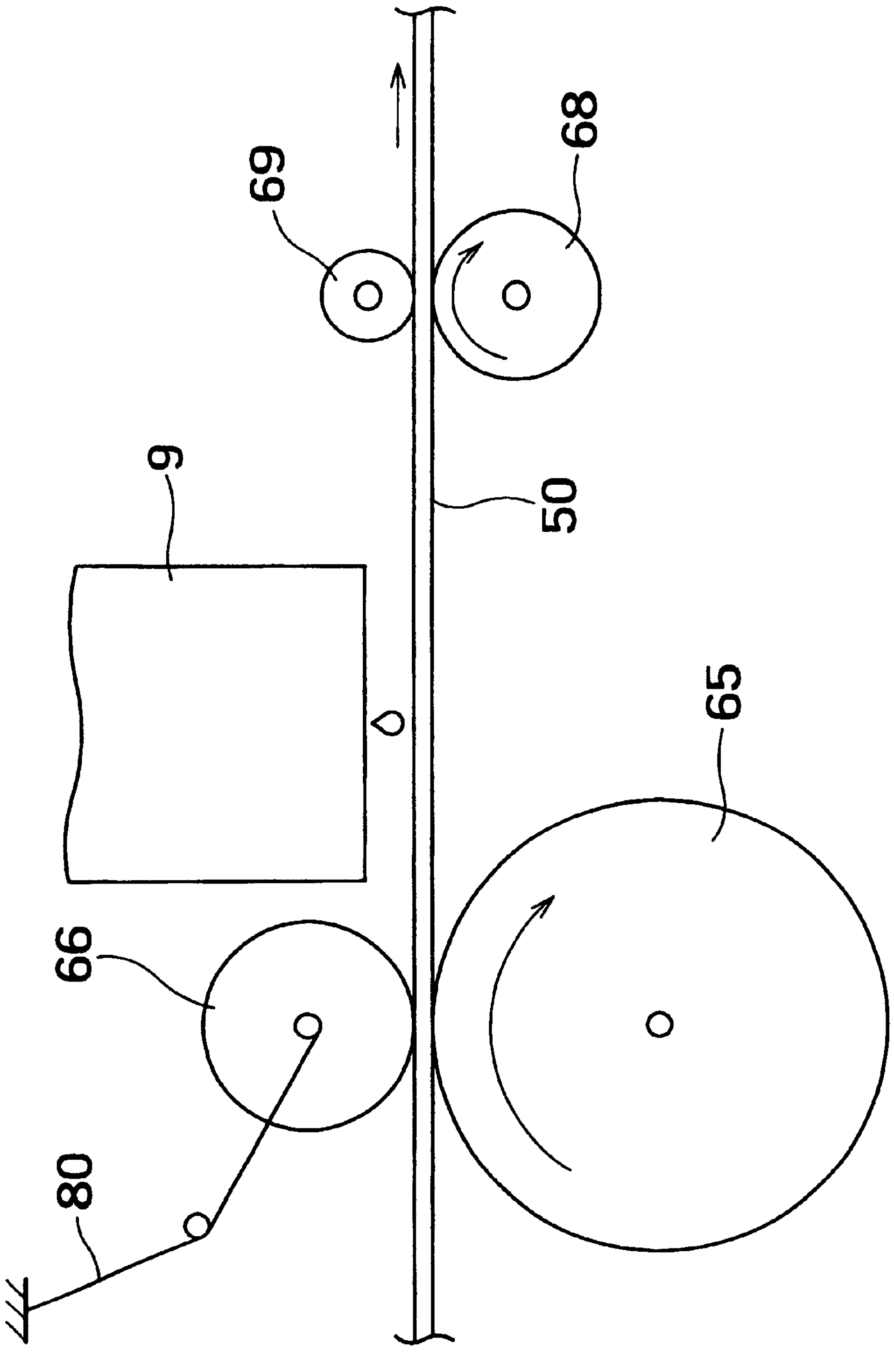
FIG. 9 PRIOR ART
FIG. 9 is a diagram illustrating a paper feeding mechanism.

The motor control apparatus 6 according to the second embodiment of the invention has a configuration in which a pulse counter 6*p* and a current value signal generator 6*q* are added to the conventional motor control apparatus 6 shown in FIG. 7. The part of the motor control apparatus 6 other than the pulse counter 6*p* and the current value signal generator 6*q* was already explained, its explanation is omitted here.

Configurations and operations of the pulse counter 6*p* and the current value signal generator 6*q* are explained below with reference to FIGS. 15 through 17.

The current value signal generator 6*q* is made up of a current value determiner 71 and a detector 72 as shown in FIG. 15.

Figure 10:
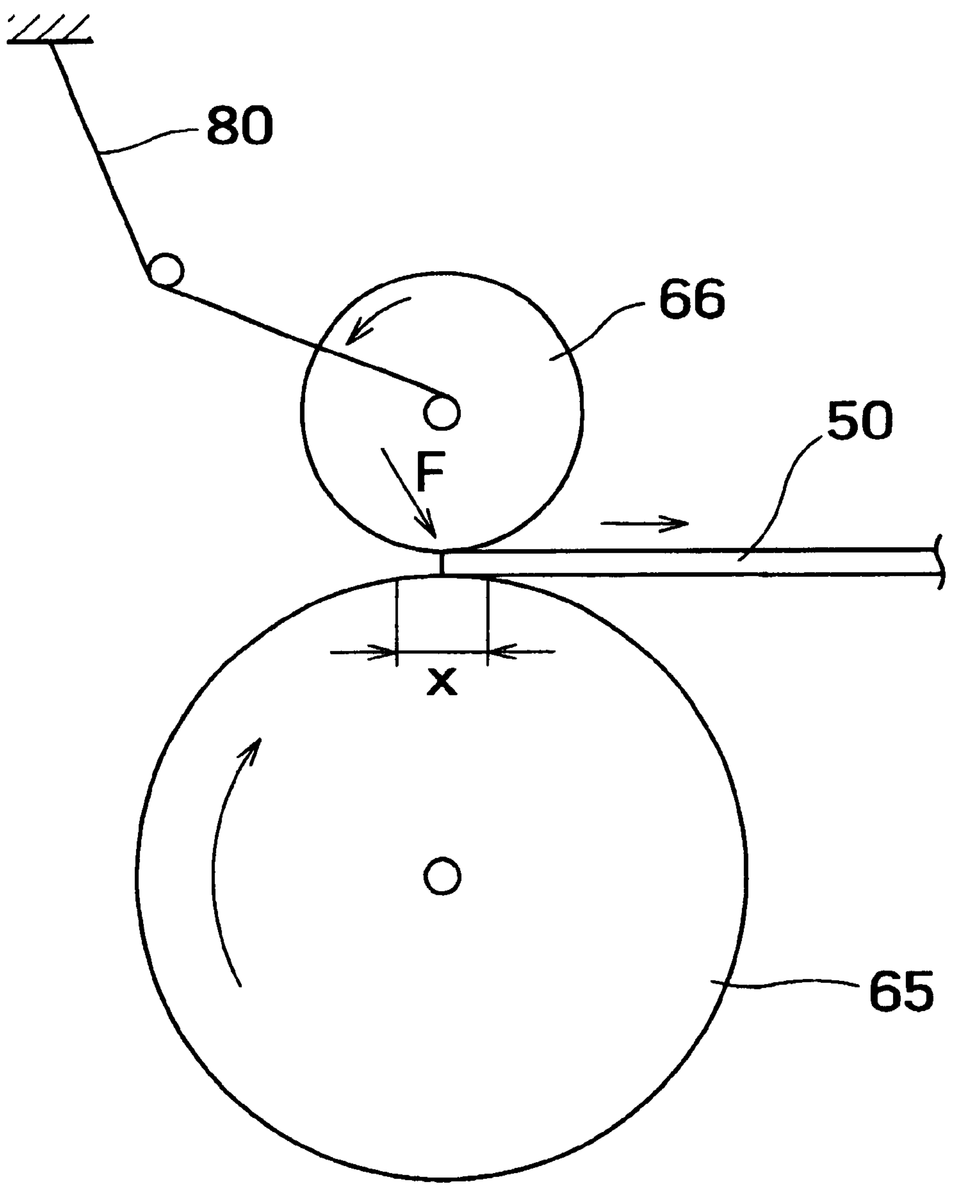
FIG. 10 PRIOR ART
FIG. 10 is a diagram that illustrates a conventional problem.

Assume here that a target position to locate a perimeter of a sheet 50 within the extent between a paper-feeding roller 65 and a follower roller 66 after transporting the sheet (the extent x shown in FIG. 10) has been given to a DC unit 6 and a PF motor 1 has been started. Then, as the perimeter of the sheet 50 approaches the target position within the predetermined extent between the paper feeding roller 65 and the follower roller 66, the positional deviation that is the output of the subtracter 6*b* approaches zero.

When the positional deviation that is the output of the subtracter 6*b* reaches zero, that is, when the perimeter of the sheet 50 reaches the target position (see the step F1 in FIG. 16 and the time $t_0$ in FIG. 17), the pulse counter 6*p* starts counting the risings and tailing edges of output pulses ENC-A, ENC-B of the encoder 13 (see the step F2 of FIG. 16). If the count value is still lower than a predetermined value (for example, 5) even after a predetermined period of time (see the step F3), it is considered that the sheet 50 is held in the predetermined extent between the paper feeding roller 65 and the follower roller 66. Thus the control is finished, and a printing process takes place.

The reason why the value 5 is selected as the predetermined value lies in that the DC motor is difficult to stop at the position where the positional deviation zero and it is usually stopped within the range where the positional deviation is ±3.

Once the count value goes equal to or more than the predetermined value (=5) (see the point of time $t_1$ of FIG. 17), an instruction signal is sent from the pulse counter 6*p* to the current value determiner 71 of the current value signal generator 6*q*. Then, the current value determiner 71 of the current value signal generator 6*q* determines a current value signal, which will become a predetermined current value $I_1$ necessary for rotating the PF motor 1 in the reverse direction, and sends it to the D/A converter 6*j* (see the step F4 of FIG. 15). The predetermined current value $I_1$ is determined in accordance with thickness of the sheet 50, for example, and it may be the minimum value among absolute values of current values causing the PF motor 1 to rotate in the reverse direction, for example. It is previously obtained by experiments.

The current value signal which will become the predetermined current value $I_1$ is converted to an analog current instruction value by the D/A converter 6*j*, and sent out to the driver 2. Then the driver 2 drives the PF motor 1 such that the current value additionally applied to the PF motor 1 becomes $I_1$. At that time, the adder 6*i* and the acceleration controller 6*m* do not work, and their outputs are all zero. The current value signal that will become the said predetermined current value $I_1$ is output from the current value signal generator 6*q* when the output pulse ECN-B of the encoder 13 is the "H" level, i.e., from the point of time $t_1$ to $t_2$ shown in FIG. 17.

As a result, the PF motor 1 rotates in the reverse direction or stops. Whether the PF motor 1 has stopped or not is detected by the detector 72 of he current value signal generator 6*q* from output pulses of the encoder 13 (see the step F5 of FIG. 16).

If it is judged that the PF motor 1 has not stopped, a current value signal of a current value $I_2$ that is smaller than the preceding one but equal in sign ($|I_2|<|I_1|$) is determined by the current value signal determiner 71 of the current value signal generator 6*q* (see the point of time $t_3$ of FIG. 17), and sent to the D/A converter 6*j* (see the step F6 of FIG. 16). In this case, the current value signal, which is the current value $I_2$, is output from the current value signal generator 6*q* when the output pulse ENC-B of the encoder 13 maintains the "H level", i.e. during the period from the point of time $t_3$ to $t_4$ shown in FIG. 17.

After that, those steps are repeated until the flow returns to the step F5 where the sheet 50 stops. In the step F5, if the sheet is judged to have stopped, it is considered that the perimeter of the sheet 50 is held in the predetermined extend (extent x shown in FIG. 10) between the paper feeding roller 65 and the follower roller 66, and a signal is sent from the detector 72 to the current value determiner 71 which thereafter continuously output the current value signal (see the point of time $t_5$ of shown in FIG. 17).

The current value determined by the current value determiner 71 is preferably extracted from a table that store values previously obtained through experiments, or the like.

As explained above, according to the embodiment of the invention, the perimeter of the sheet 50 can be held within the predetermined extent between the paper feeding roller 65 and the follower roller 66, and a wide area of the sheet to near its perimeters can be used for printing.

Figure 18:
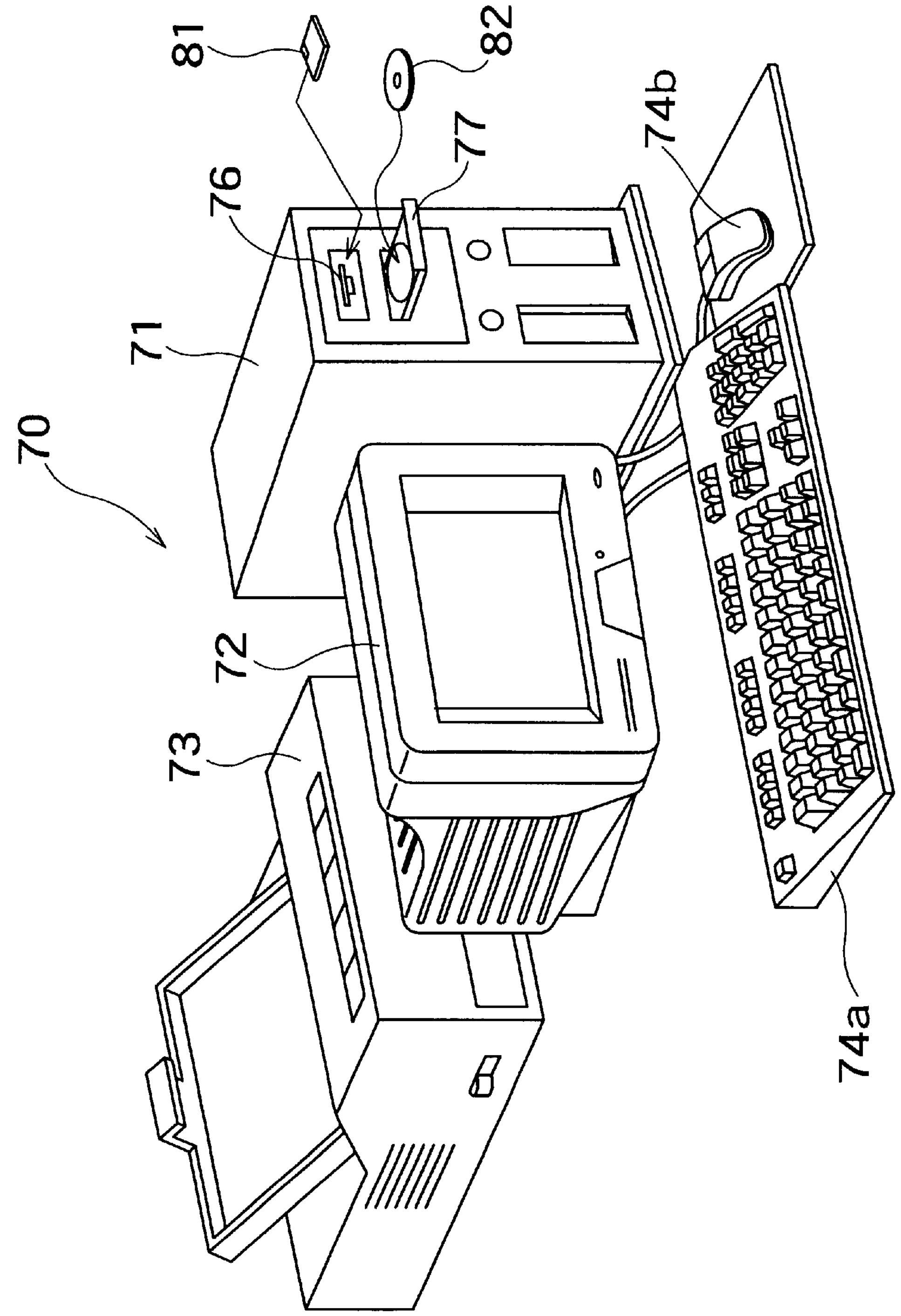
FIG. 18 is an explanatory diagram that shows configuration in external appearance of a recording medium having recorded a program for executing a motor control method according to the invention and a computer system in which the recording medium is used.
Figure 19:
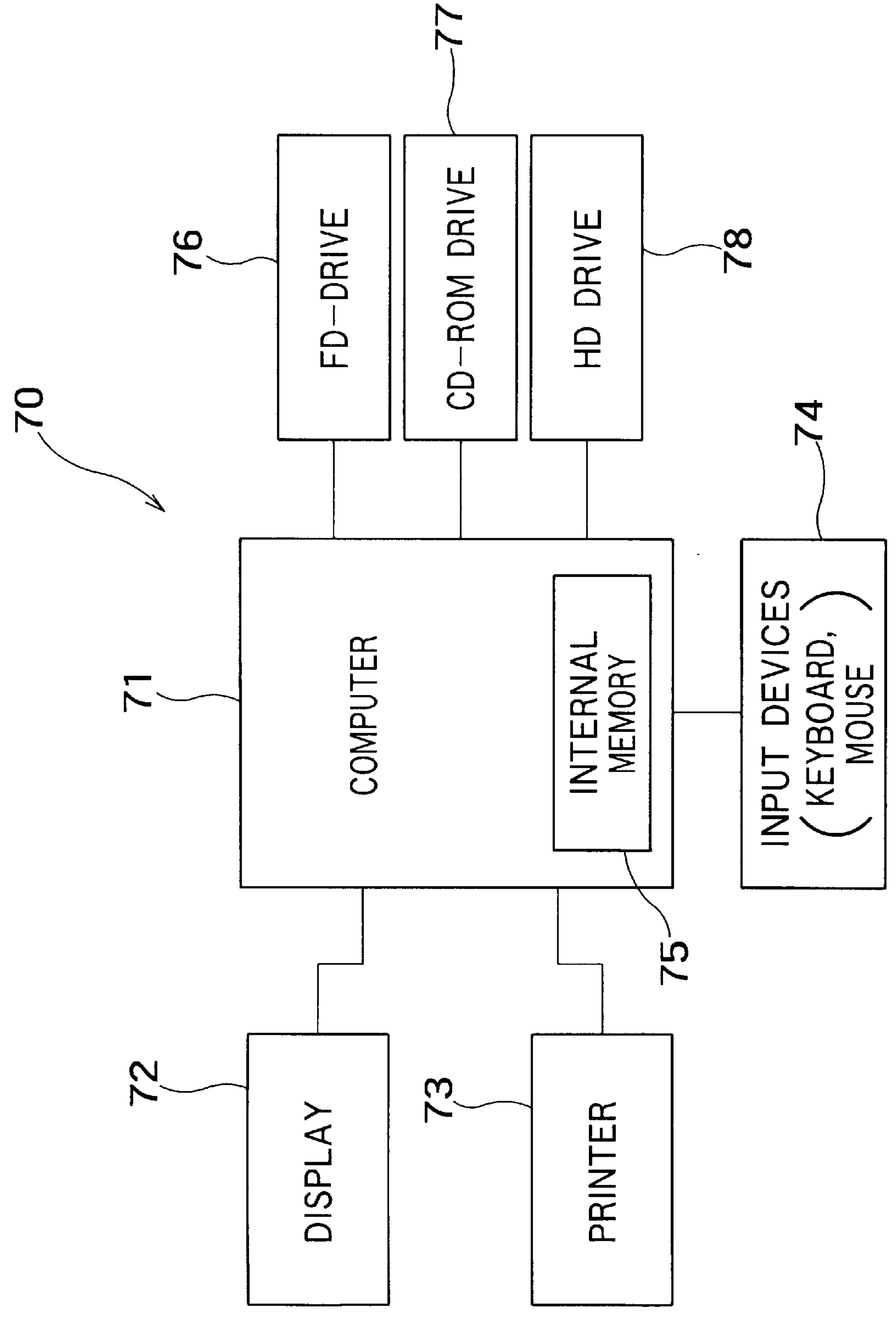
FIG. 19 is a block diagram that shows configuration of the computer system shown in FIG. 18.

FIG. 18 is an explanatory diagram that illustrate configuration in external appearance of a recording medium having recorded a program for executing a motor control method according to the invention and a computer system in which the recording medium is used, and FIG. 19 is a block diagram that shows configuration of the computer system shown in FIG. 18.

The computer system 70 shown in FIG. 18 is made up of a computer main body 71 housed in a casing like a mini tower, for example, a display 72 such as CRT (cathode ray tube), plasma display, liquid crystal display, or the like, a printer 73 as a record output apparatus, a key board 74*a* and a mouse 74*b* as input devices, a flexible disk drive 76, and a CD-ROM drive 77. FIG. 19 illustrates configuration of the computer system 70 as a block diagram, and the casing that houses the computer main body 71 further contains internal memory 75 such as RAM (random access memory), for example, and external memory like a hard disk drive unit 78, for example. The recording medium having recorded a computer program for executing the motor control method according to the invention is used on the computer system 70. Used as the recording medium is a flexible disk 81 or CD-ROM (read only memory) 82, for example, but other means may be used, such as MO (magneto-optical) disk, DVD (digital versatile disk), other optical recording disks, card memory, magnetic tape, and so on.

What is claimed is:

1. A motor control apparatus comprising:

a position detector for detecting a position of paper to be driven by a paper feeding motor on the basis of encoder pulses output from an encoder that rotates in response to rotation of the paper feeding motor;

a drive controller for controllably driving said paper feeding motor by additionally applying a current value to said paper feeding motor on the basis of a target feeding value of said paper and an output of said position detector; and a stop position prediction controller for instructing deenergization of the paper feeding motor a predetermined period of time later than arrival of the pages to be driven by the paper feeding motor at a predetermined position on the basis of said encoder pulses output from the encoder in response to rotation of the paper feeding motor, said predetermined period of time corresponding to a predetermined condition upon arrival of said paper to be driven at said predetermined position, and said predetermined position being at a predetermined distance before a target stop position of the paper to be driven, wherein a current value signal is generated causing said paper to stop or move in the reverse direction from the normal paper feeding direction in response to said encoder pulses output from said encoder after the feeding amount of said paper reaches said target feeding value, and the drive controller controllably drives said paper feeding motor by said drive controller in response to said current value signal.

2. The motor control apparatus according to claim 1 wherein said predetermined period of time is determined to a value that ensures said paper to be driven stops at said target stop position.

3. A motor control apparatus comprising:

a position detector for detecting a position of paper to be driven by a paper feeding motor on the basis of encoder pulses output from an encoder that rotates in response to rotation of the paper feeding motor;

a drive controller for controllably driving said paper feeding motor by additionally applying a current value to said paper feeding motor on the basis of a target feeding value of said paper and an output of said position detector; and a stop position prediction controller for instructing deenergization of the paper feeding motor a predetermined period of time later than arrival of the paper to be driven by the paper feeding motor at a speed measuring position on the basis of said encoder pulses output from the encoder in response to rotation of the paper feeding motor, said predetermined period of time corresponding to a current speed of said paper feeding motor upon arrival of said paper to be driven at said speed measuring position, and said speed measuring position being at a predetermined distance before a target stop position of the paper to be driven, wherein a current value signal is generated causing said paper to stop or move in the reverse direction from the normal paper feeding direction in response to said encoder pulses output from said encoder after the feeding amount of said paper reaches said target feeding value, and the drive controller controllably drives said paper feeding motor by said drive controller in response to said current value signal.

4. The motor control apparatus according to claim 3 wherein said predetermined period of time is determined to be in an extent that ensures deenergization of said paper feeding motor is instructed before arrival of said paper to be driven at said target stop position.

5. The motor control apparatus according to claim 3 wherein said predetermined period of time varies substantially in reverse proportion to said current speed of the paper feeding motor upon arrival of said paper to be driven at said speed measuring position.

6. The motor control apparatus according to claim 3 wherein said predetermined period of time is determined to a value that ensures said paper to be driven stops at said target stop position.

7. A motor control apparatus comprising:

a position calculator for calculating and outputting a current position of a paper to be driven by a paper feeding motor on the basis of encoder pulses output from an encoder in response to rotation of the paper feeding motor;

a speed calculator for calculating and outputting a current speed of said paper feeding motor on the basis of said encoder pulses;

a drive controller for controllably driving said paper feeding motor by additionally applying a current value to said paper feeding motor on the basis of a target feeding value of said paper and an output of said position calculation; and a stop position prediction controller for outputting a deenergization instruction signal, which instructs deenergization of said paper feeding motor, a predetermined period of time later than arrival of said paper to be driven at a speed measuring position, said predetermined period of time corresponding to said current speed of said paper feeding motor upon arrival of said paper to be driven at said speed measuring position, and said speed measuring position being at a predetermined distance before a target stop position of said paper to be driven, wherein a current value signal is generated causing said paper to stop or move in the reverse direction from the normal paper feeding direction in response to said encoder pulses output from said encoder after the feeding amount of said paper reaches said target feeding value, and the drive controller controllably drives said paper feeding motor by said drive controller in response to said current value signal.

8. The motor control apparatus according to claim 7 wherein said predetermined period of time is determined to be in an extent that ensures said deenergization instruction signal is output before arrival of said paper to be driven at said target stop position.

9. The motor control apparatus according to claim 7 further comprising a data storage portion for storing data on relations between the current speed of said paper feeding motor upon arrival of said paper to be driven at said speed measuring position and said predetermined period of time.

10. The motor control apparatus according to claim 7 wherein said stop position prediction controller measures said predetermined period of time by counting the number of said encoder pulses.

11. The motor control apparatus according to claim 7 wherein said stop position prediction controller measures said predetermined period of time by counting the number of pulses of a predetermined clock.

12. The motor control apparatus according to claim 7 wherein destination of said deenergization instruction signal is a drive signal generator that generates a drive signal for rotatably driving said paper feeding motor.

13. The motor control apparatus according to claim 7 wherein said predetermined period of time varies substantially in reverse proportion to said current speed of the paper feeding motor upon arrival of said paper to be driven at said speed measuring position.

14. The motor control apparatus according to claim 7 wherein said predetermined period of time is determined to a value that ensures said paper to be driven stops at said target stop position.

15. A motor control method comprising:

detecting a position of paper to be driven by a paper feeding motor on the basis of encoder pulses output from an encoder that rotates in response to rotation of the paper feeding motor;

controllably driving, via a drive controller, said paper feeding motor by additionally applying a current value to said paper feeding motor on the basis of a target feeding value of said paper and an output of said detected position;

instructing deenergization of the paper feeding motor a predetermined period of time later than arrival of the paper to be driven by the paper feeding motor at a predetermined position on the basis of said encoder pulses output from the encoder in response to rotation of the paper feeding motor, said predetermined period of time corresponding to a predetermined condition upon arrival of said paper to be driven at said predetermined position, and said predetermined position being at a predetermined distance before a target stop position of the paper to be driven;

generating a current value signal causing said paper to stop or move in the reverse direction from the normal paper feeding direction in response to said encoder pulses output from said encoder after the feeding amount of said paper reaches said target feeding value; and controllably driving said paper feeding motor by said drive controller in response to said current value signal.

16. A motor control method comprising:

detecting a position of paper to be driven by a paper feeding motor on the basis of encoder pulses output from an encoder that rotates in response to rotation of the paper feeding motor;

controllably driving, via a drive controller, said paper feeding motor by additionally applying a current value to said paper feeding motor on the basis of a target feeding value of said paper and an output of said detected position;

instructing deenergization of the paper feeding motor a predetermined period of time later than arrival of the paper to be driven by the paper feeding motor at a speed measuring position on the basis of said encoder pulses output from the encoder in response to rotation of the paper feeding motor, said predetermined period of time corresponding to a current speed of said paper feeding motor upon arrival of said paper to be driven at said speed measuring position, and said speed measuring position being at a predetermined distance before a target stop position of the paper to be driven;

generating a current value signal causing said paper to stop or move in the reverse direction from the normal paper feeding direction in response to said encoder pulses output from said encoder after the feeding amount of said paper reaches said target feeding value; and controllably driving said paper feeding motor by said drive controller in response to said current value signal.

17. The motor control method according to claim 16 wherein, for the purpose of determining said predetermined period of time, data is previously collected and stored concerning relations between the current speed of said paper feeding motor upon arrival of said paper to be driven at said speed measuring position and said predetermined period of time.

18. A motor control method comprising:

measuring a current position of a paper to be driven by a paper feeding motor and monitoring whether said paper to be driven has reached a speed measuring position at a predetermined distance before a target stop position of said paper to be driven;

controllably driving said paper feeding motor by additionally applying a current value to said paper feeding motor on the basis of a target feeding value of said paper on an output of the measured current position of the paper;

measuring said current speed of said paper feeding motor upon arrival of said paper to be driven at said speed measuring position;

determining a predetermined period of time corresponding to said current speed of said paper feeding motor upon arrival of said paper to be driven at said speed measuring position;

instructing deenergization of said paper feeding motor said predetermined period of time later than arrival of said paper to be driven at said speed measuring position;

generating a current value signal causing said paper to stop or move in the reverse direction from the normal paper feeding direction in response to said encoder pulses output from said encoder after the feeding amount of said paper reaches said target feeding value; and controllably driving said paper feeding motor by said drive controller in response to said current value signal.

19. The motor control method according to claim 18 wherein, for the purpose of determining said predetermined period of time, data is previously collected and stored concerning relations between the current speed of said paper feeding motor upon arrival of said paper to be driven at said speed measuring position and said predetermined period of time.

20. A motor control apparatus having a position detector for detecting the position of paper to be driven by a paper feeding motor on the basis of output pulses of an encoder that rotates in response to rotation of the paper feeding motor, and a drive controller for controllably driving said paper feeding motor by additionally applying a current value to said paper feeding motor on the basis of a target feeding value of said paper and an output of said position detector, wherein a current value signal is generated causing said paper to stop or move in the reverse direction from the normal paper feeding direction in response to output pulses given from said encoder after the feeding amount of said paper reaches said target feeding value, and the drive controller controllably drives said paper feeding motor by said drive controller in response to said current value signal.

21. The motor control apparatus according to claim 20 further comprising:

a pulse counter for counting output pulses of said encoder during movement of said paper in said reverse direction from the normal paper feeding direction after the feeding amount of said paper reaches said target feeding value and for outputting an instruction signal when the count value reaches a predetermined value; and a current value signal generator for generating said current value signal upon receipt of said instruction signal or during movement of said paper in the reverse direction from the normal paper feeding direction.

22. The motor control apparatus according to claim 21 wherein said current value signal generator includes:

a detector for detecting whether said paper remains still, or is moving in the reverse direction from the normal paper feeding direction, in response to outputs from said encoder; and a current value determiner for determining and outputting said current value signal in response to said instruction signal or a result of detection by said detector.

23. The motor control apparatus according to claim 22 wherein said current value determiner outputs the same current value signal as the latest current value signal when said paper remains still, and generates a current value signal that is smaller in absolute value than the latest current value signal but equal in sign when said paper is moving in the reverse direction from the normal paper feeding direction.

24. A motor control method comprising the steps of:

generating a current value signal causing paper to stop or move in the reverse direction from a normal paper feeding direction in response to output pulses given from an encoder after the paper feeding amount reaches a target feeding value, said encoder rotating in response to rotation of a paper feeding motor; and controllably driving said paper-feeding motor in response to said current value signal.

25. The motor control apparatus according to claim 24 wherein the step of generating said current value signal includes the steps of:

counting output pulses of said encoder during movement of said paper in the reverse direction from the normal paper feeding direction; and generating said current value signal when the count value of said output pulses reaches a predetermined value.

26. A motor control apparatus comprising:

a stop position prediction controller for instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said predetermined condition includes an ambient temperature in addition to a current speed of said motor upon arrival of said subject to be driven at said predetermined position.

27. A motor control apparatus comprising:

a stop position prediction controller for instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said predetermined condition includes an ambient humidity in addition to a current speed of said motor upon arrival of said subject to be driven at said predetermined position.

28. A motor control apparatus comprising:

a stop position prediction controller for instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a carriage motor of a printer, said predetermined condition including a remaining quantity of ink in addition to a current speed of said motor upon arrival of said subject to be driven at said predetermined position.

29. A motor control apparatus comprising:

a stop position prediction controller for instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a paper feeding motor of a printer, said predetermined condition including a nature of a printing paper in addition to a current speed of said motor upon arrival of said subject to be driven at said predetermined position.

30. A motor control apparatus comprising:

a stop position prediction controller for instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a paper feeding motor or a carriage motor of a printer, said predetermined condition including a frequency of use of the printer in addition to a current speed of said motor upon arrival of said subject to be driven at said predetermined position.

31. A motor control method comprising:

instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said predetermined condition includes an ambient temperature in addition to a current speed of said motor upon arrival of said subject to be driven at said predetermined position.

32. A motor control method comprising:

instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said predetermined condition includes an ambient humidity in addition to a current speed of said motor upon arrival of said subject to be driven at said predetermined position.

33. A motor control method comprising:

instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a carriage motor of a printer, said predetermined condition including a remaining quantity of ink in addition to a current speed of said motor upon arrival of said subject to be driven at said predetermined position.

34. A motor control method comprising:

instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a paper feeding motor of a printer, said predetermined condition including a nature of a printing paper in addition to a current speed of said motor upon arrival of said subject to be driven at said predetermined position.

35. A motor control method comprising:

instructing deenergization of a motor a predetermined period of time later than arrival of a subject to be driven by the motor at a predetermined position on the basis of encoder pulses output from an encoder in response to rotation of the motor, said predetermined period of time corresponding to a predetermined condition upon arrival of said subject to be driven at said predetermined position, and said predetermined position being at a predetermined distance before a target stop position of the subject to be driven, wherein said motor is a paper feeding motor or a carriage motor of a printer, said predetermined condition including a frequency of use of the printer in addition to a current speed of said motor upon arrival of said subject to be driven at said predetermined position.

* * * * *